United States Patent
Goto et al.

(10) Patent No.: US 8,306,427 B2
(45) Date of Patent: Nov. 6, 2012

(54) WDM TRANSMISSION APPARATUS, OPTICAL ADD-DROP MULTIPLEXER AND WDM TRANSMISSION METHOD

(75) Inventors: Ryosuke Goto, Kawasaki (JP); Takehiro Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 12/640,387

(22) Filed: Dec. 17, 2009

(65) Prior Publication Data

US 2010/0158532 A1 Jun. 24, 2010

(30) Foreign Application Priority Data

Dec. 24, 2008 (JP) .................................. 2008-328547

(51) Int. Cl.
*H04J 14/02* (2006.01)
(52) U.S. Cl. .......................................... 398/97; 398/26
(58) Field of Classification Search .................... 398/26, 398/34, 83–85, 97
See application file for complete search history.

(56) References Cited

U.S. PATENT DOCUMENTS

| | | | |
|---|---|---|---|
| 6,496,619 B2 | 12/2002 | Naganuma | |
| 6,646,792 B2 | 11/2003 | Nakamura | |
| 2002/0048062 A1* | 4/2002 | Sakamoto et al. | 359/124 |
| 2006/0222366 A1 | 10/2006 | Sugaya | |
| 2009/0022499 A1* | 1/2009 | Roy et al. | 398/158 |

FOREIGN PATENT DOCUMENTS

| | | |
|---|---|---|
| JP | 2000-4062 | 1/2000 |
| JP | 2000-209160 | 7/2000 |
| JP | 2002-368315 | 12/2002 |
| JP | 2006-279896 | 10/2008 |

\* cited by examiner

*Primary Examiner* — Leslie Pascal
(74) *Attorney, Agent, or Firm* — Staas & Halsey LLP

(57) ABSTRACT

There is provided a WDM transmission apparatus including a calculator being operable to calculate an optical signal level of a wavelength after wavelength demultiplexing based on information of OSNR, an amplifier controller being operable to compensate for the optical signal levels of all the wavelengths after wavelength demultiplexing to become a target level based on an optical signal level calculated by the calculator, and an deviation corrector being operable to correct a deviation of an optical signal level between each wavelength based on the optical signal level calculated by the calculator.

14 Claims, 23 Drawing Sheets

RELATED ART

FIG. 12A                                    RELATED ART
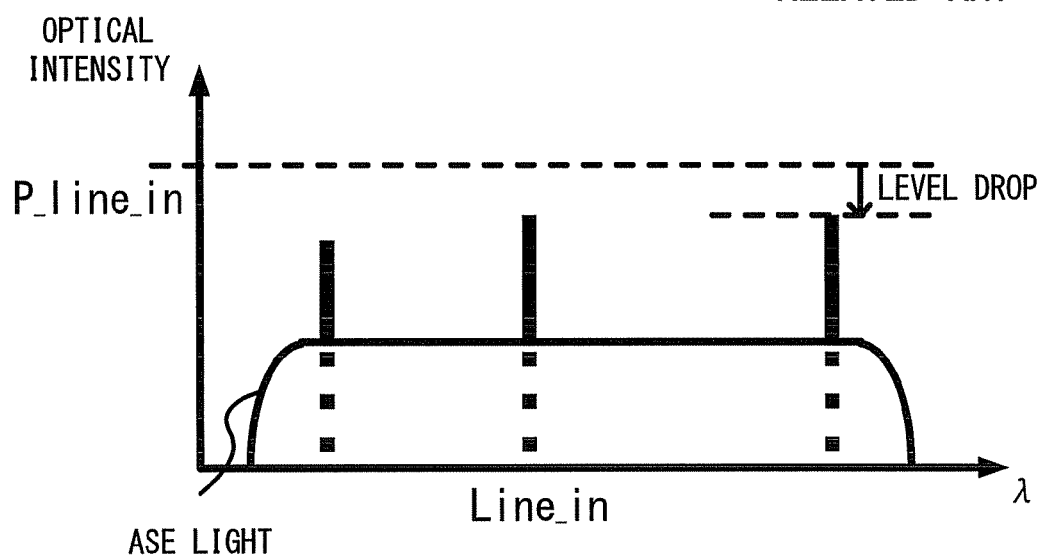
FIG. 12B                                    RELATED ART
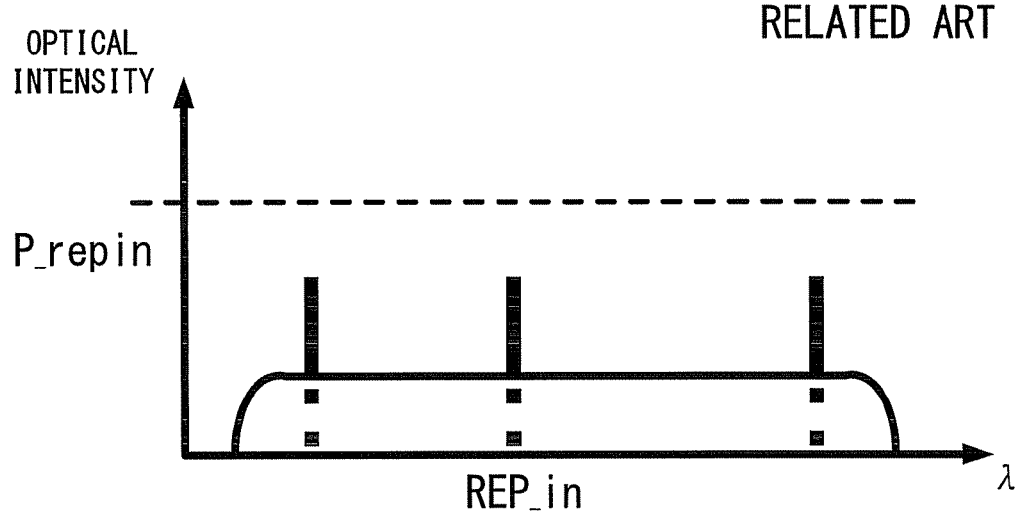

WDM TRANSMISSION APPARATUS, OPTICAL ADD-DROP MULTIPLEXER AND WDM TRANSMISSION METHOD

CROSS-REFERENCE TO RELATED APPLICATION

This application is based upon and claims the benefit of priority of the prior Japanese Patent Application No. 2008-328547, filed on Dec. 24, 2008, the entire contents of which are incorporated herein by reference.

FIELD

The embodiments discussed herein are related to WDM transmission apparatus, optical add-drop multiplexers and WDM transmission method, which correct the output power of an optical signal in a wavelength division multiplexing (WDM) system.

BACKGROUND

In recent years, as a result of the increase in communications traffic, large-capacity optical communication systems have been introduced. In order to increase the communication capacity, WDM that multiplexes and transmits signals having a plurality of wavelengths has been proposed. Increasing the number of wavelengths to be multiplexed allows low-cost operations. Hereafter, the wavelength that carries the optical signal might be described to channel in the WDM system. Furthermore, instead of point-to-point WDM systems, optical add-drop multiplexers (OADM) that adds and/or drops channels at an arbitrary node have been introduced. Thus, a flexible network allowing long distance and high-capacity transmission is formed.

In an optical transmission system, optical-signal-to-noise ratio (OSNR) is generally used as a parameter for indicating the transmission quality of a signal. The value of OSNR limits the transmission distance of the system. FIG. 10A is a diagram illustrating a configuration of a relay section in a communication system. One relay section (which also be called a span) in the communication system includes an optical fiber 1500 having a predetermined length and a repeater 1501. FIG. 10B to FIG. 10D are diagrams illustrating signal levels at spots within the relay section. The horizontal axis indicates the wavelength, and the vertical axis indicates the optical intensity. In the WDM system, a plurality of signals, which are wavelength-division-multiplexed on the optical fiber 1500, are input (Line_in); are reduced by the loss of the optical fiber 1500 having a predetermined length and the reduced signals are input to the repeater 1501 (REP_in); the input signals are amplified by the repeater 1501 and the resulting signal is output (REP_out). In a real system, the configuration of one section illustrated in FIG. 10A is applied in a plurality of sections for signal transmission. During the amplification in the repeater 1501, the ASE noise (amplified spontaneous emission noise) generated in the amplifier may deteriorate the OSNR. The degree of the deterioration may determine the number of relay sections (or the number of spans for transmission), that is, the transmittable distance. The OSNR may be determined by the noise figure (NF) of the amplifier and the input level (Pin) to the amplifier, as expressed in:

$$\text{OSNR} = Pin - \text{NF} + \text{constant[dB]} \quad \text{[Formula 1]};$$

Constant: $h\upsilon\Delta f$;

(h: Planck constant, $\upsilon$: optical frequency, and $\Delta f$: normalized bandwidth)

Here, if the NF of the amplifier is a fixed value, the OSNR depends on the input level to the amplifier in the repeater 1501. In other words, as the input level decreases, the OSNR deteriorates proportionately. As a result, the transmission distance decreases. In general transmitting apparatus, various controls are performed so as to prevent the decrease in level as much as possible. Those controls typically include two of level equalization (or gain equalization) and ASE correction.

First of all, the level equalization will be described. FIG. 11A to FIG. 11C are diagrams illustrating the correction of level deviations among channels. It is assumed that there is a level deviation ΔP among channels at the transmission path input point (Line_in) as illustrated in FIG. 11A or the amplifier input point (REP_in) in the repeater 1501 as illustrated in FIG. 11B (where the channel average level is equal to that in FIGS. 10A to 10B). In this case, as illustrated in FIG. 11C, the OSNR of the repeater output (REP_out) of the channels at a lower level, such as a channel in a wavelength λ1, deteriorates on the basis of Formula 1. The channel (in λ1) limits the transmission distance and limits the system performance. This difficulty may be solved by a technology in which the level deviation (which may also be called gain deviation or tilt) among channels is cancelled by a system so as to raise the level of a specific channel with a low OSNR and thus cancel the limit on the transmission distance. (Refer to Japanese Laid-Open Patent Publication No. 2000-209160, for example.)

Next, ASE correction will be described. FIG. 12A to FIG. 12C are diagrams illustrating ASE correction. A WDM amplifier normally monitors the total of output power of an amplifier and controls the power to a target value (which is a required output level for each channel× the number of channels), which may continuously keep the level for each channel. However, as illustrated in FIG. 12A, when the number of the channels is as low as several channels, the proportion of ASE power in the total power to be monitored is relatively high. Thus, when the amplifier output level is controlled without consideration of the proportion of the ASE power, the level for each channel decreases (Line_in (corresponding to one upstream REP_out)). As a result, as illustrated in FIG. 12B, the optical signal level for each channel to be input to a repeater decreases (REP_in), resulting in, as illustrated in FIG. 12C, deterioration of the OSNR arises (REP_out). In order to solve the difficulty, on the ASE correction, there is provided a technique in which input light is demultiplexed into signal light component of the channels and an ASE light component in the amplification band of the amplifier so as to control an amplifier such that the signal light component have a target value. (Refer to Japanese Laid-Open Patent Publication No. 2002-368315, for example.)

If the decrease in signal levels of each channel is prevented by using the above technology, the OSNR deterioration may be prevented. Therefore the extension of the transmission distance may thus be expected. However, even when two measures of the level equalization and ASE correction are taken, there is another factor for deteriorating the OSNR. It is OSNR deterioration caused by variations in ASE levels of the respective amplifiers. FIG. 13A and FIG. 13B are diagrams illustrating an ASE correction when the ASE level is not constant. As illustrated in FIG. 13A, when an ASE profile is not flat, the OSNR deteriorates at a channel where the ASE is relatively high, and the transmission distance is limited. In order to solve the difficulty, as illustrated in FIG. 13B, a pre-emphasis method may be used. By using the method, at a node provided at downstream side, or preferably at a node provided at far end of the downstream on which a receiver is provided, signals having lower OSNRs are amplified in advance so as to keep signal levels constant.

The configuration may eliminate the OSNR deviations among channels after transmission, may prevent the OSNR deterioration of an optical signal at a specific channel and increases the transmission distance.

SUMMARY

According to an aspect of the embodiment, there is provided a WDM transmission apparatus including a calculator being operable to calculate an optical signal level of a wavelength after wavelength demultiplexing based on information of OSNR, an amplifier controller being operable to compensate for the optical signal levels of all the wavelengths after wavelength demultiplexing to become a target level based on an optical signal level calculated by the calculator, and an deviation corrector being operable to correct a deviation of an optical signal level between each wavelength based on the optical signal level calculated by the calculator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 12A to 12C are diagrams illustrating ASE correction;

DESCRIPTION OF EMBODIMENTS

In OADM systems to which apply the WDM system, there remain factors for causing an OSNR deterioration. An OADM system demultiplexes a WDM signal into components of channels to perform processing signal at an add/drop site. However, there is a difficulty that the demultiplexed components of channels contains both signal light component and ASE light component, which is a factor for causing OSNR deteriorations.

Figure 14A:
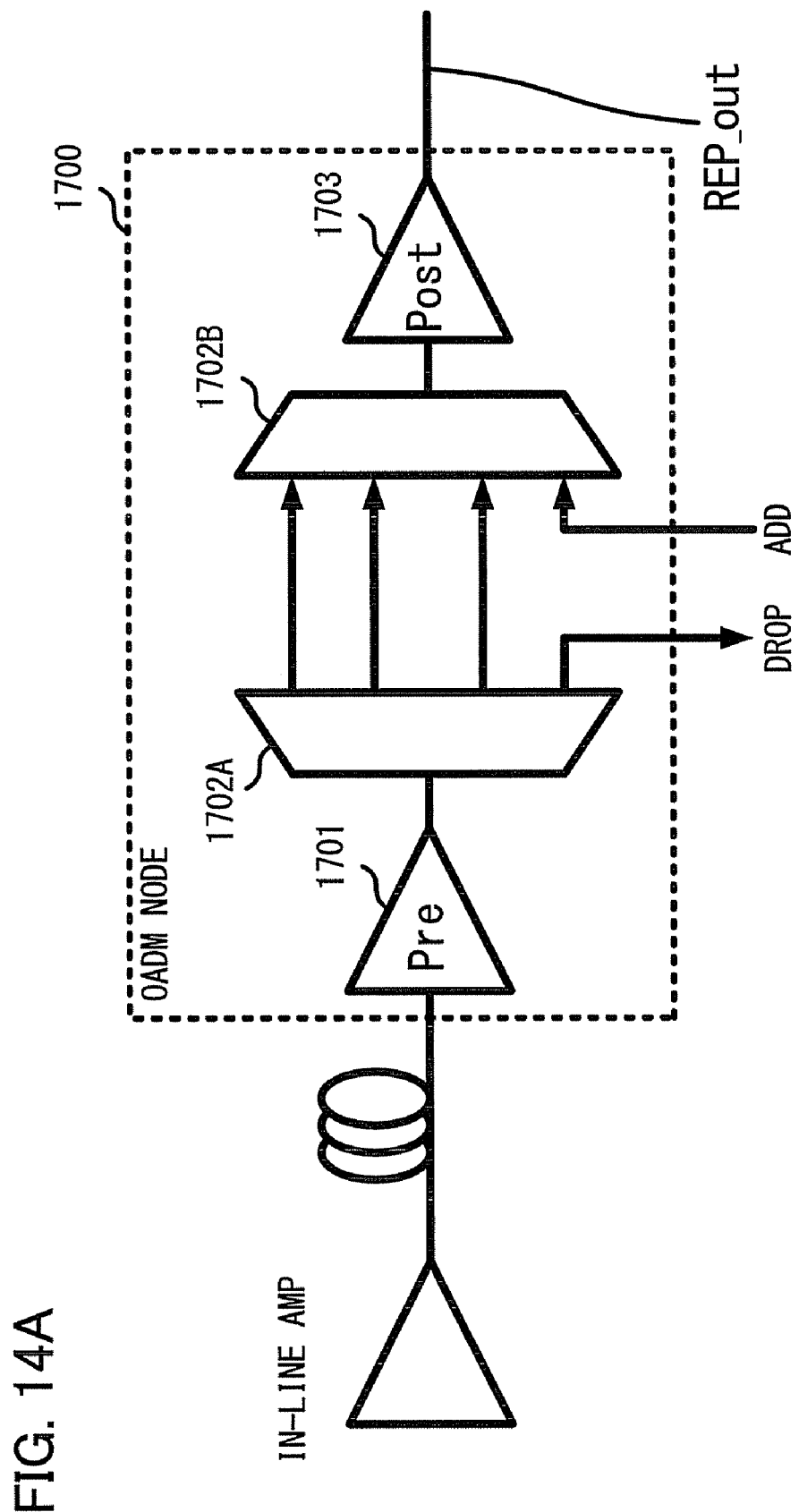
FIG. 14A is a diagram illustrating an OADM node.

FIG. 14A is a diagram illustrating an OADM node. An OADM node 1700 has a pre-amplifier 1701A, a demultiplexer 1702A subsequently and a multiplexer 1702B further subsequently. An optical signal is added/dropped between the demultiplexer 1702A and multiplexer 1702B. The multiplexer 1702B is followed by a post-amplifier 1703.

Figure 14B:
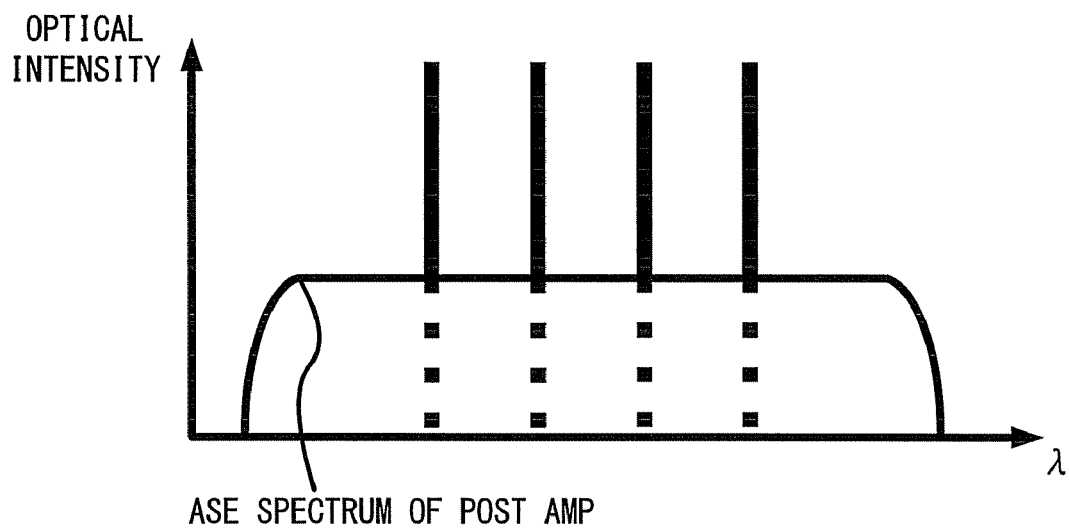
FIG. 14B is a diagram illustrating an optical spectrum observed after passing through the OADM.

FIG. 14B is a diagram illustrating an (apparent) optical spectrum observed after passing through the OADM. Since the demultiplexer 1702A and multiplexer 1702B remove unnecessary ASE accumulated on the upstream side, the observed spectrum appears as only having an ASE spectrum in the post-amplifier 1703.

Figure 14C:
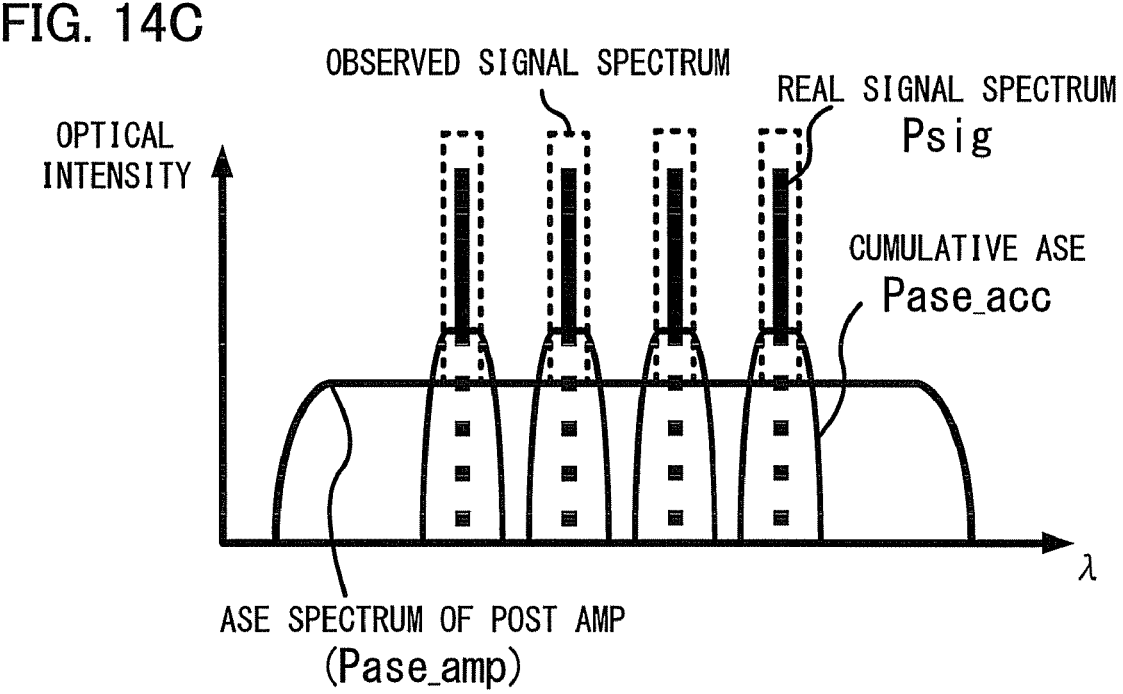
FIG. 14C is a diagram illustrating a real optical spectrum after passing through the OADM.

FIG. 14C is a diagram illustrating a real optical spectrum after passing through the OADM. Unlike FIG. 14B, in reality, the ASE (Pase_acc) within a signal pass band of filters in the demultiplexer 1702A and multiplexer 1702B is not removed. Thus, as illustrated in FIG. 14C, a spectrum having the sum of the signal light component and the ASE light component is observed. It is difficult to properly control level of a signal which passed actually through the filters in the demultiplexer 1702A and multiplexer 1702B because the technologies of the level equalization, ASE correction and pre-emphasis method are performed on the spectrum of the sum of the signal light component and the ASE light component.

For example, regarding ASE correction in FIG. 14C, a method in the past performs correction only in consideration of the ASE spectrum of the post-amplifier. Thus, the intensity of the observed signals is controlled to be a target level. The observed signals are illustrated by the dashed line in FIG. 14C. In reality, the signal spectrum (Psig) decreases by the amount equal to the ASE level within the filter pass band compared with the observed signal spectrum, which may cause an OSNR deterioration.

Figure 15A:
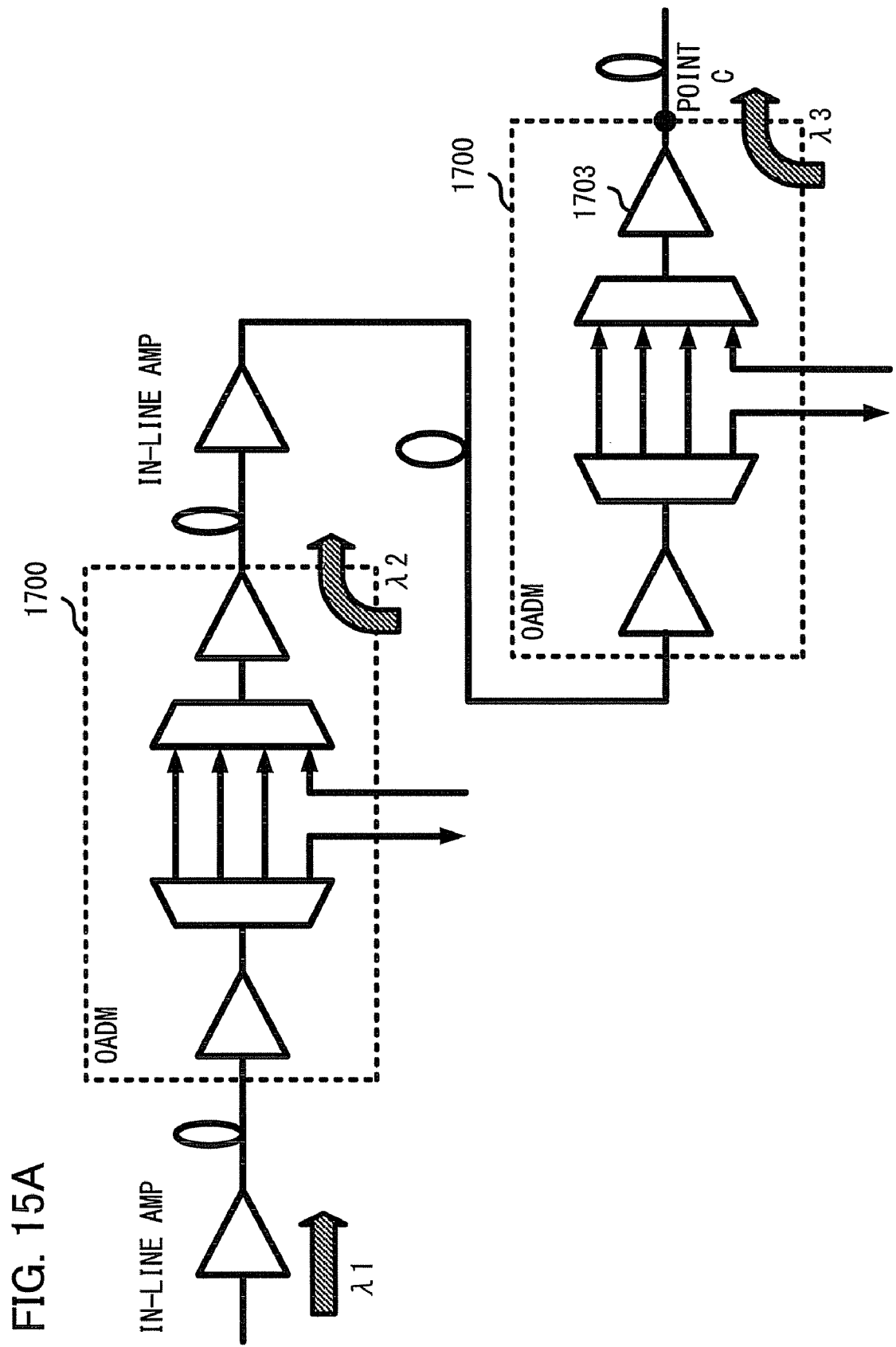
FIG. 15A is a diagram illustrating a configuration of an OADM system.
Figure 15B:
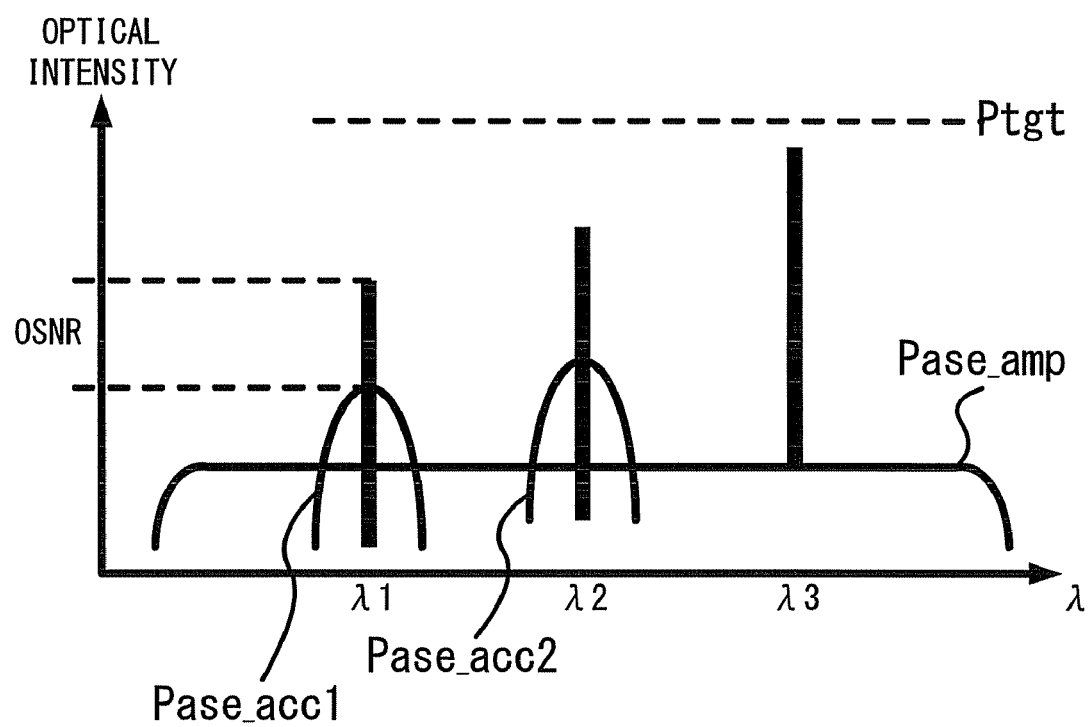
FIG. 15B is a diagram illustrating an optical spectrum subsequent to the post-amplifier in the OADM.

FIG. 15A is a diagram illustrating a configuration of an OADM system. FIG. 15B is a diagram illustrating an optical spectrum subsequent to the post-amplifier in the OADM. In a real OADM system, as illustrated in FIG. 15A, a plurality of OADMs 1700 are connected in tandem, and there is a mix of channels passing through various optical paths. Thus, as illustrated in FIG. 15B, the OSNRs of the channels are different at the output point C of the post-amplifier 1703. Therefore, the amount of ASE passing through the filters used in the demultiplexer and multiplexer is different among the channels. As a result, the signal levels are different among the channel. Any of the controls as described above that increases the output power of the post-amplifier by a predetermined amount by ASE correction may not adjust the channels to an optimum level.

Figure 16A:
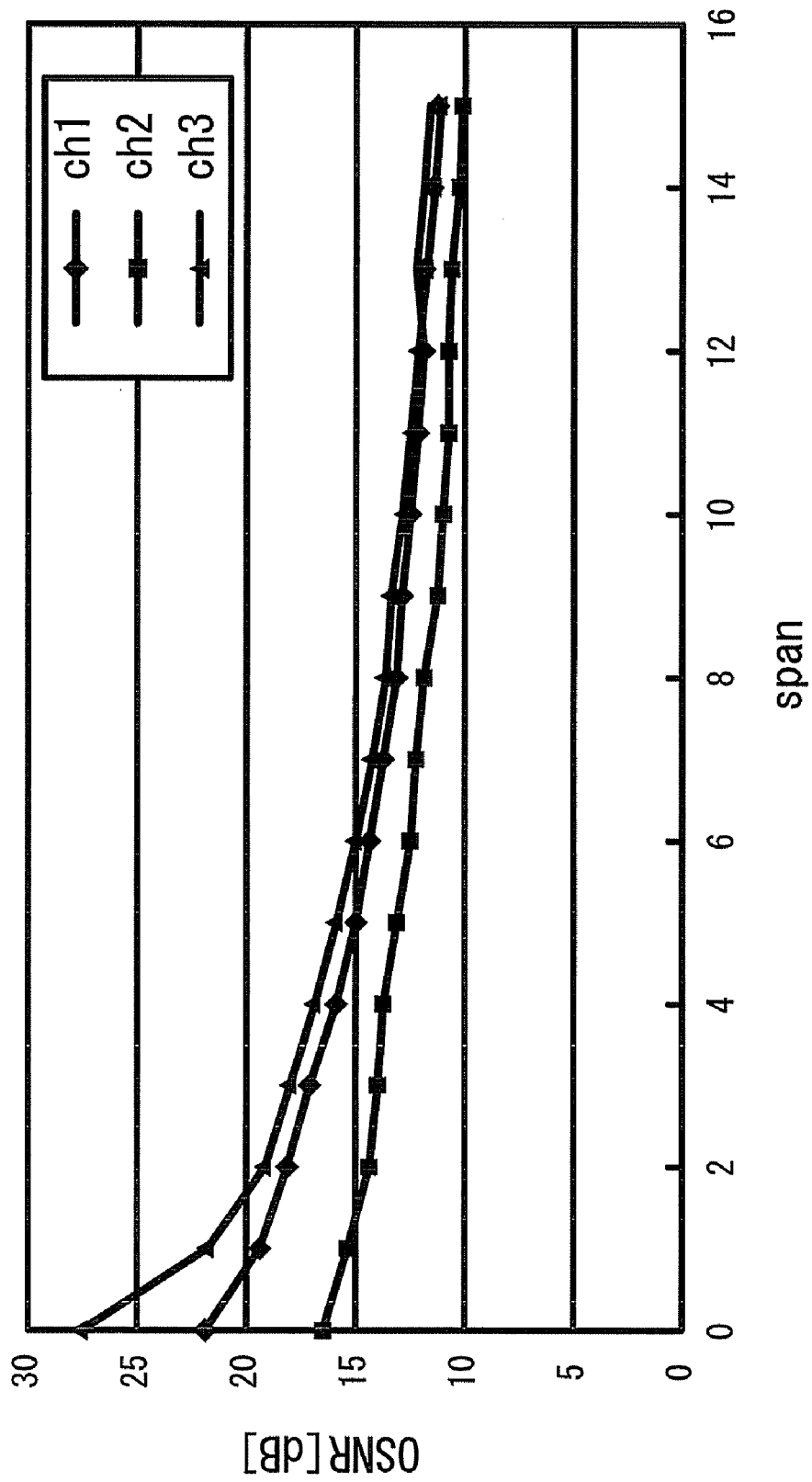
FIG. 16A is a diagram illustrating OSNRs observed in accordance with a technology in the past.

FIG. 16A is a diagram illustrating (apparent) OSNRs observed in WDM transmission according to a technology in the past. The horizontal axis indicates the number of spans, and the vertical axis indicates the OSNR. While control is performed so as to make the signal levels of the channels illustrated in FIG. 14B even, FIG. 16A illustrates an example that is calculated on assuming that variations among channels as illustrated in FIG. 15B have occurred. FIG. 16A illustrates calculation results assuming three-band WDM transmission in the example that changes the OSNR at the spans of the transmission through a total of 15 spans. The calculations were performed where the relay amplifier NF: 5 dB, the relay amplifier input level: −30 dBm/ch, the relay amplifier output level: 0 dBm/ch, channel multiplexing/demultiplexing filter bandwidth of the relay node: 70 GHz, and transmit OSNR: 22 dB on channel 1, 16 dB on channel 2, and 28 dB on channel 3. Without consideration of the ASE level on a filter band, the observed signal spectrum is typically kept at 0 dBm/ch, which is the target value.

Figure 16B:
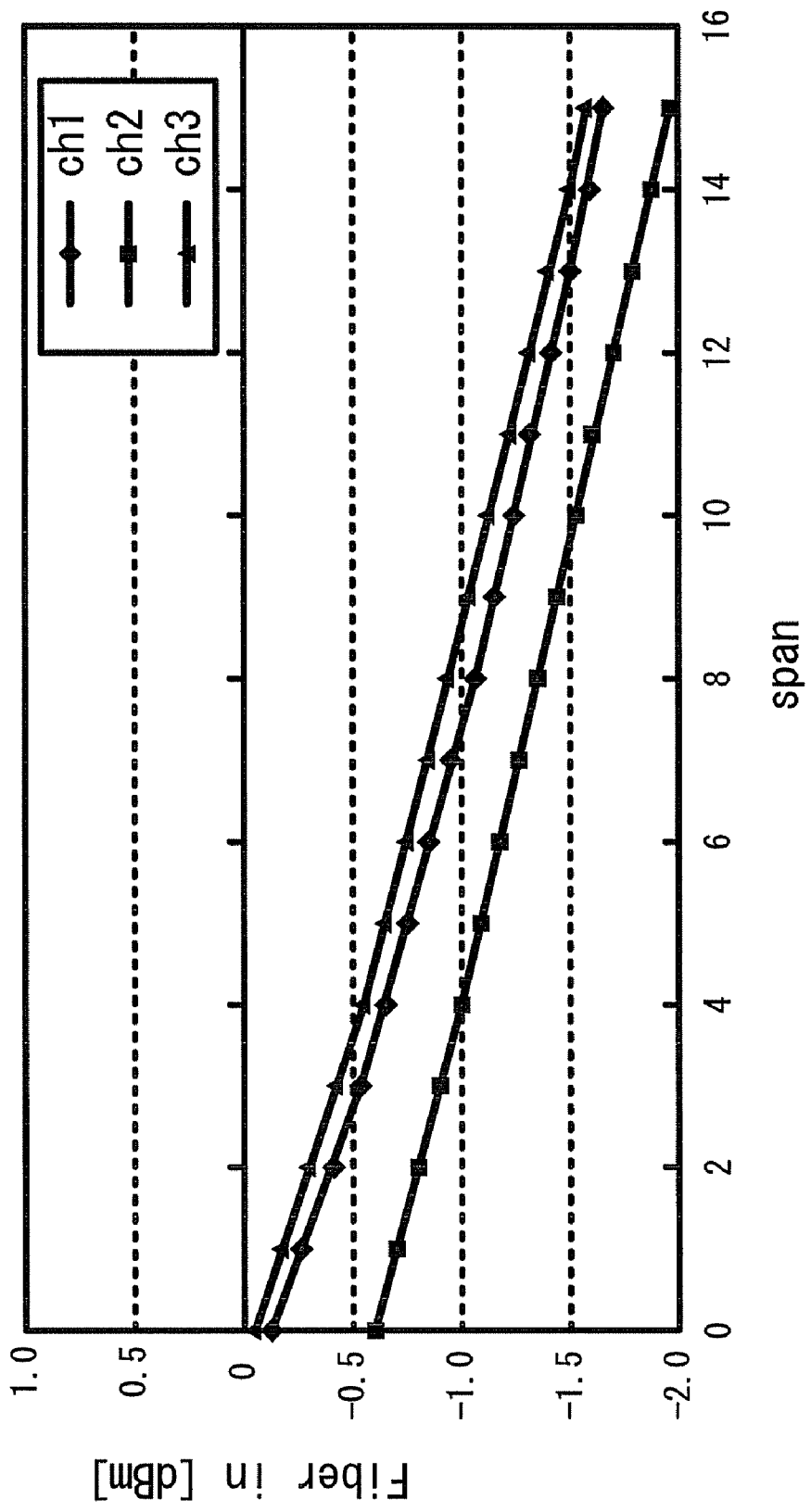
FIG. 16B is a diagram illustrating input signal levels at spans when transmission is performed without consideration of the ASE light component within a filter in accordance with a technology in the past.

FIG. 16B is a diagram illustrating signal input levels at spans when transmission is performed without consideration of the ASE light component within a filter on the basis of WDM transmission according to a technology in the past. The horizontal axis indicates the number of spans, and the vertical axis indicates the input level. As illustrated in FIG. 16B, the power of a signal light component actually included in the input level decreases as the number of spans increases, which causes an OSNR deterioration as a result. In other words, even when the OSNR after transmission is observed as approximately 10 dB in FIG. 16A, the real OSNR is approximately 1 to 2 dB lower as illustrated in FIG. 16B. Therefore, the transmission distance decreases proportionally (which is approximately 30% to 40% shorter in this example). Furthermore, since the OSNRs are different among channels, the channel 2 having the worst OSNR has the largest amount of level reduction. It is difficult for the technologies in the past to correct such deviations among channels.

With reference to drawings, preferred embodiments of the WDM transmission apparatus, optical add-drop multiplexer and WDM transmission method will be described in detail. The WDM transmission apparatus performs: [1] processing for adjusting such that the signal levels of all channels becomes a target level; and [2] processing for eliminating signal level deviations among channels. In the processing, the information on OSNRs at channels is used to detect the levels of an optical signal on the channels. Thus, even when the signal levels among channels after passing through filters in a demultiplexer/multiplexer are different from the ASE levels of the channels, the real signal level at all of the channels may be equalized to output. This may eliminate the OSNR deviation at a receiving end of the optical signal. Hence, the increase in number of spans in an OADM, for example, may be feasible, and the transmission distance may be increased.

Outline of WDM Transmission Apparatus

Figure 1:
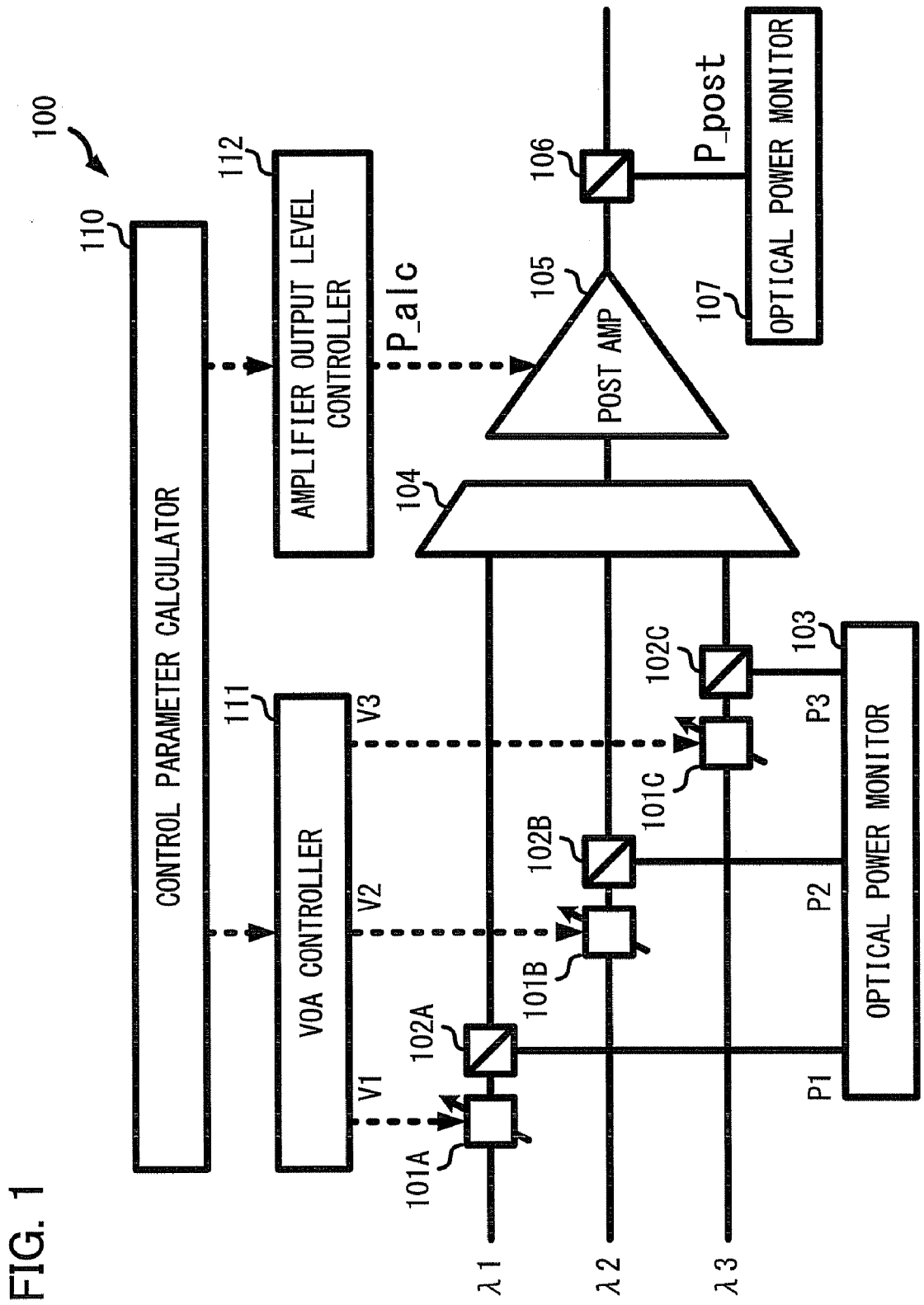
FIG. 1 is a diagram schematically illustrating a WDM transmission apparatus.

FIG. 1 is a diagram schematically illustrating a WDM transmission apparatus. FIG. 1 includes solid lines indicating paths for an optical signal and dashed lines indicating control paths for electric signals. The WDM transmission apparatus 100 includes optical variable attenuators (VOA) 101A to 101C that adjust the optical signal levels of wavelengths λ (or λ1 to λ3) on the channels after wavelength demultiplexing, couplers 102A to 102C that cause the optical signals on channels to branch off and a first optical power monitor 103 that separately detects optical powers P1 to P3 branched off by the couplers 102A to 102C.

The optical signals in the wavelengths (λ1 to λ3) on the channels are multiplexed by a multiplexer (Mux) 104, and the multiplexed optical signals are collectively amplified on all channels by a post-amplifier, 105 and are output. The output optical signals has a total power P_post of all channels, the total power P_post is branched by the coupler 106, detected by a second optical power monitor 107.

The control parameter calculator 110 receives the information of the optical powers P1 to P3 in the wavelengths on the channel detected by the first optical power monitor 103 and a total power P_post of all of the channels detected by the second optical power monitor 107. The control parameter calculator 110 pre-stores the settings of a target signal level Ptgt [dBm] for level correction on an optical signal, a pass bandwidth BW [nm] of a filter used in the demultiplexer and multiplexer. The control parameter calculator 110 further receives the information of the OSNRs (of OSNR 1 to OSNR 3) in wavelengths λ (of λ1 to λ3) on channels from the outside. On the basis of the information, the control parameter calculator 110 controls over [2] above, that is, controls with separate control signals V1 to V3 the attenuation amount of light in the VOAs 101A to 101C on the channels through a VOA controller 111. The control parameter calculator 110 further controls [1] above, that is, collectively controls with a control signal P_alc the output level of the post-amplifier 105 through an amplifier output level controller 112.

The VOA controller 111 functions as deviation corrector, and the amplifier output level controller 112 functions as amplifier controller. The control parameter calculator 110 functions as calculator for an OSNR and other parameters and controls the VOA controller 111 and amplifier output level controller 112.

Figure 12C:
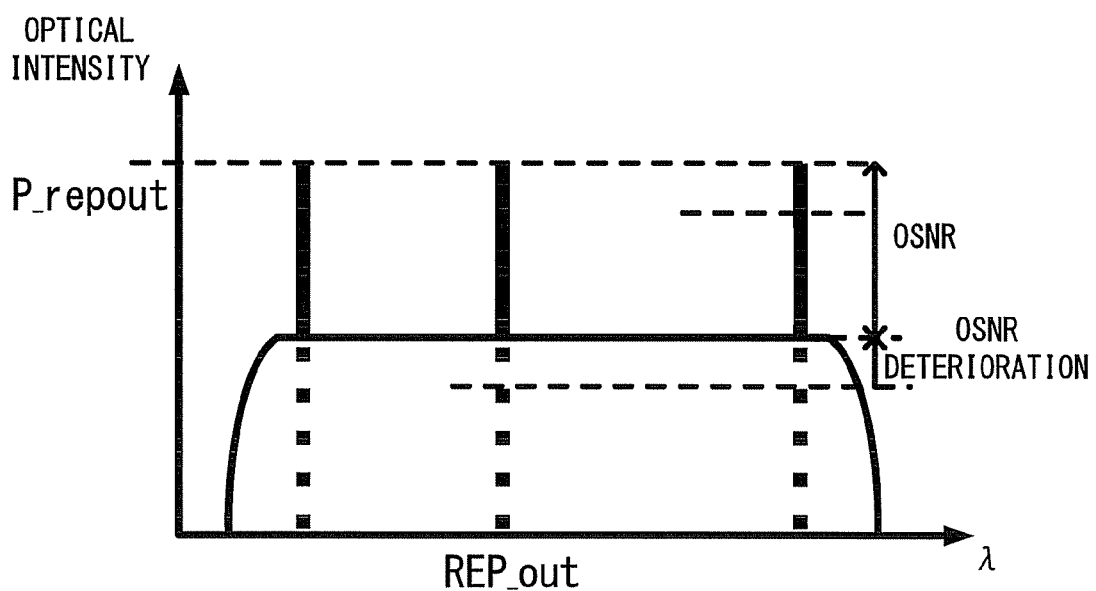
Figure 13A:
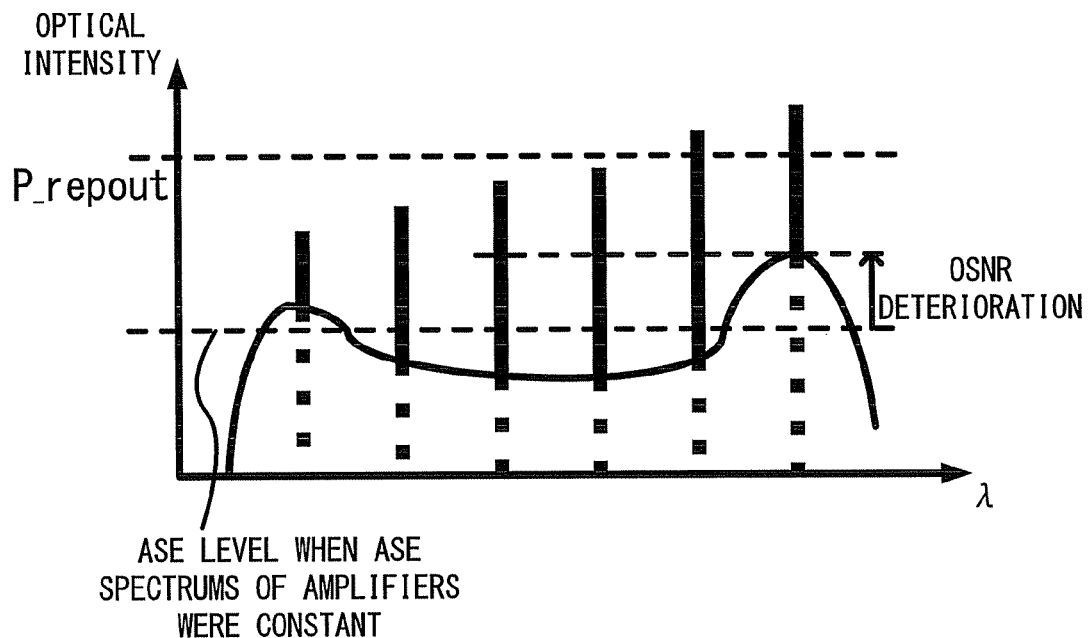
FIGS. 13A and 13B are diagrams illustrating an ASE correction when the ASE level is not constant.
Figure 13B:
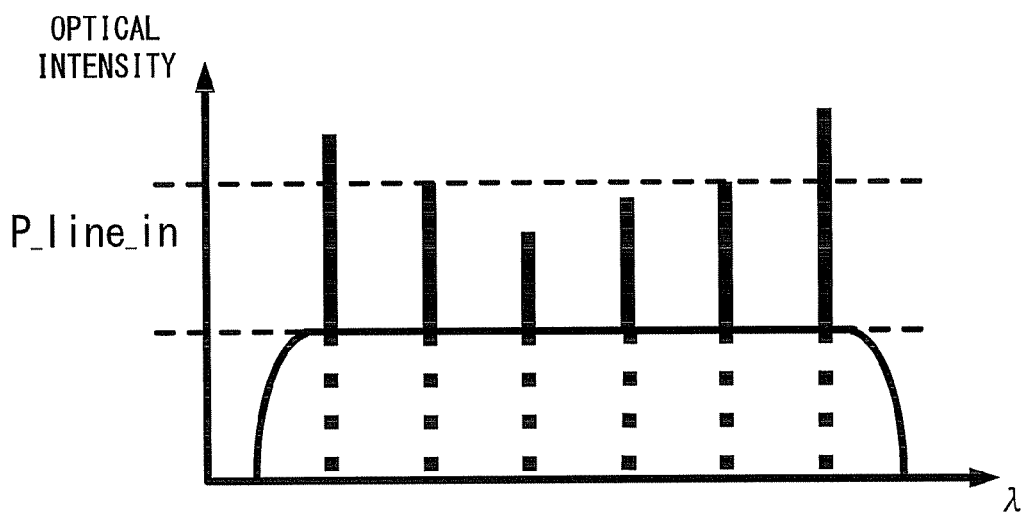

FIG. 2A to FIG. 2D are diagrams illustrating the correction states of optical signals. The horizontal axis indicates the wavelength, and the vertical axis indicates the light intensity. The initial state before the correction on an optical signal by the WDM transmission apparatus 100 is the state after when the control according to the technology above in the past, that is, the level equalization, ASE correction and pre-emphasis method are performed. Notably, when the pre-emphasis is performed, the spectrum peaks (the peaks of the dashed lines in FIG. 12A to FIG. 12C) of the channels generally differ. However, for easy understanding, the following description assumes constant peaks.

Figure 2A:
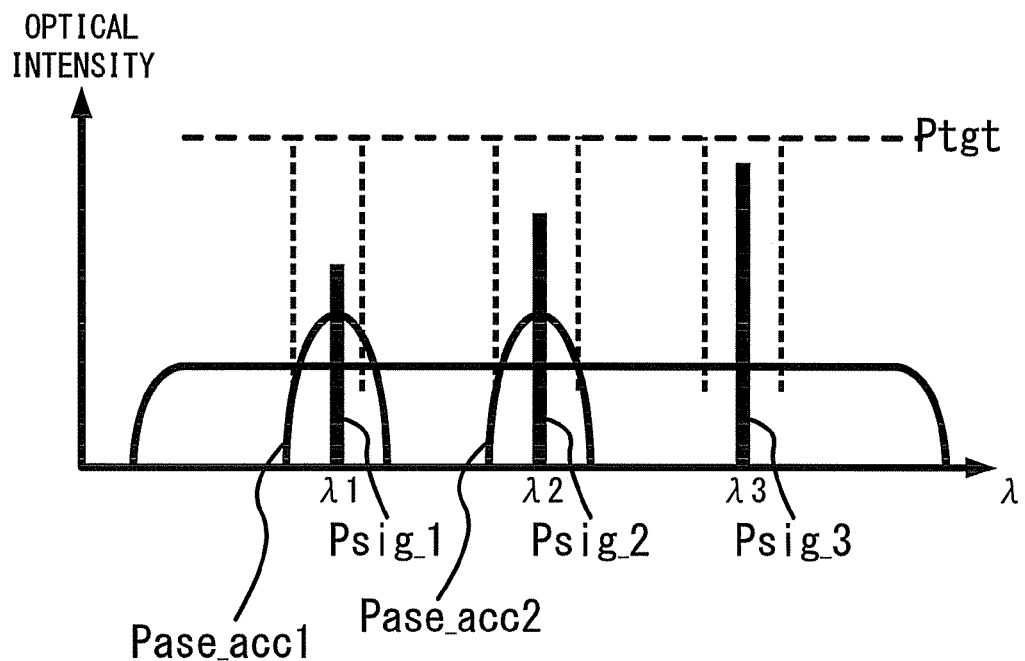
FIGS. 2A to 2D are diagrams illustrating the correction state of optical signals.

First of all, as illustrated in FIG. 2A, a total power (Psig+ Pase_acc: indicated by dashed lines) on the channels is set to a target value Ptgt [dBm/ch] by the control based on the technology in the past. More specifically, a) the powers (P1, P2 and P3) on the channels before multiplexing of the output of the post-amplifier 105 are level-equalized by controlling the attenuation amount by the VOA 101A to 101C such that the level of the channels detected by the first optical power monitor 103 becomes flat; b) the second optical power monitor 107 monitors the P_post and at the same time the ASE correction is performed such that all of the channels for the output of the post-amplifier 105 becomes to have a desirable target signal level Ptgt; and c) the pre-emphasis is performed as required. The illustrated dashed lines indicate the levels of an optical signal, which are detected by the apparatus, and the solid lines indicate the level of a real optical signal.

Next, the control parameter calculator 110 acquires a parameter required for performing the correction processing. For convenience of description, the corresponding elements in FIG. 1 are given in parentheses as follows.

[1] Parameters Regarding Apparatus Operating State Acquired by Detections within Apparatus:

Total power before multiplexing on channels: Pm (P1, P2 and P3) [dBm];

The amount of level control (current value) on channels: Vm (V1, V2 and V3) [dB] (wherein m is channel number); and Total output power of post-amplifier 105: P_post [dBm]

[2] Parameters Pre-Held in the Apparatus:

A target level of a signal: Ptgt [dBm/ch], which is a unique value depending on the system design;

A pass bandwidth of the demultiplexer/multiplexer: BW [nm]; and

The amount of pre-emphasis: $\Delta$Vpe_m [dB], which is a pre-emphasis set value for each channel. These are not illustrated but may be set and held in a memory, for example, (or storage medium) within the control parameter calculator 110.

[3] Externally Input Parameters of Network Operating State:

Optical signal-to-noise ratio or OSNR of each channel: OSNRm (OSNR 1, OSNR 2 or OSNR 3) [dB] (wherein m is a channel number); and Number of operating channels: L, which is acquired by calculation or a measurement device within the apparatus. The details will be described later.

The parameters [1] to [3] are used to perform control through the routines, which will be described below. The parameters in the Formulas, which will be described below, are all antilogarithms.

(1) The real signal level Psig_m of each channel is calculated. The Psig_m is calculated from a total power Pm before multiplexing on channels and the optical signal-to-noise ratio (OSNRm). In this case, the following relationships are used:

$$Pm = Psig\_m + Pase\_acc\_m \quad \text{[Formula 2]}$$

$$OSNRm = Psig\_m / \{Pase\_acc\_m \times (0.1/BW)\} \quad \text{[Formula 3]}$$

(where Pase_acc_m is an ASE power on each channel)
From these relationships, Psig_m is calculated.

$$Psig\_m = Pm / [1 / \{(BW/0.1) \times (1/OSNRm) + 1\}] \quad \text{[Formula 4]}$$

Figure 2B:
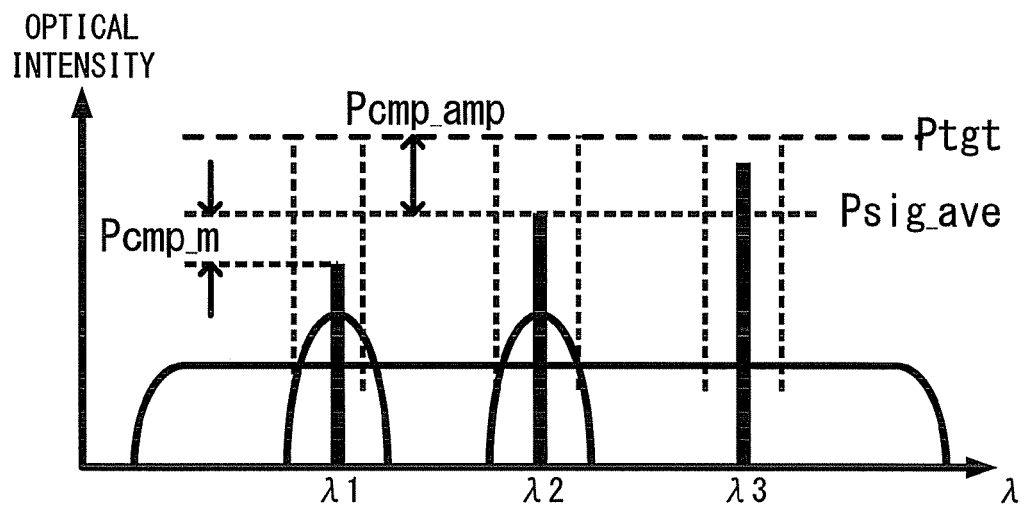

(2) Next, as illustrated in FIG. 2B, the signal level average value (Psig_ave) of all channels is calculated.

$$Psig\_ave = (\Sigma Psig\_m)/L \quad \text{[Formula 5]}$$

(3) Next, a necessary amount of level correction is acquired. A necessary amount of WDM band level correction across all bands is equal to Pcmp_amp, which is a difference between the Ptgt and the Psig_ave.

$$Pcmp\_amp = Ptgt / Psig\_ave \quad \text{[Formula 6]}$$

A necessary amount of level correction for each channel is equal to Pcmp_m, which is a difference between the Psig_ave and the Psig_m.

$$Pcmp\_m = Psig\_ave / Psig\_m \quad \text{[Formula 7]}$$

Figure 2C:
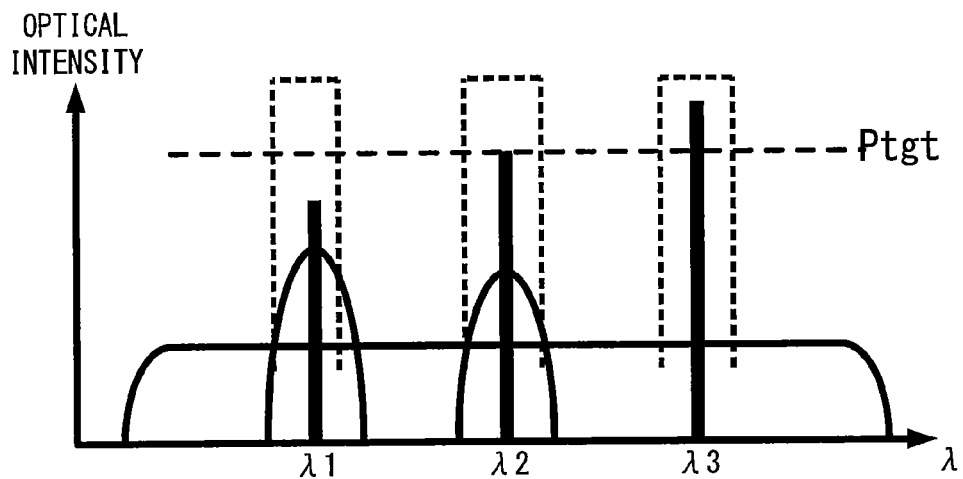

(4) Next, the correction illustrated in FIG. 2C is performed. Here, the output power of the post-amplifier 105 is corrected.

$$P\_post' = P\_post \times Pcmp\_amp \quad \text{[Formula 8]}$$

Thus, as illustrated in FIG. 2C, signal level average value (Psig_ave) of all channels regarding optical signals on all channels are raised to a target level Ptgt of the signals. In the illustrated example, the real level (illustrated by the solid line) of the optical signal of the channel in the wavelength $\lambda$2 is the target level Ptgt.

Figure 2D:
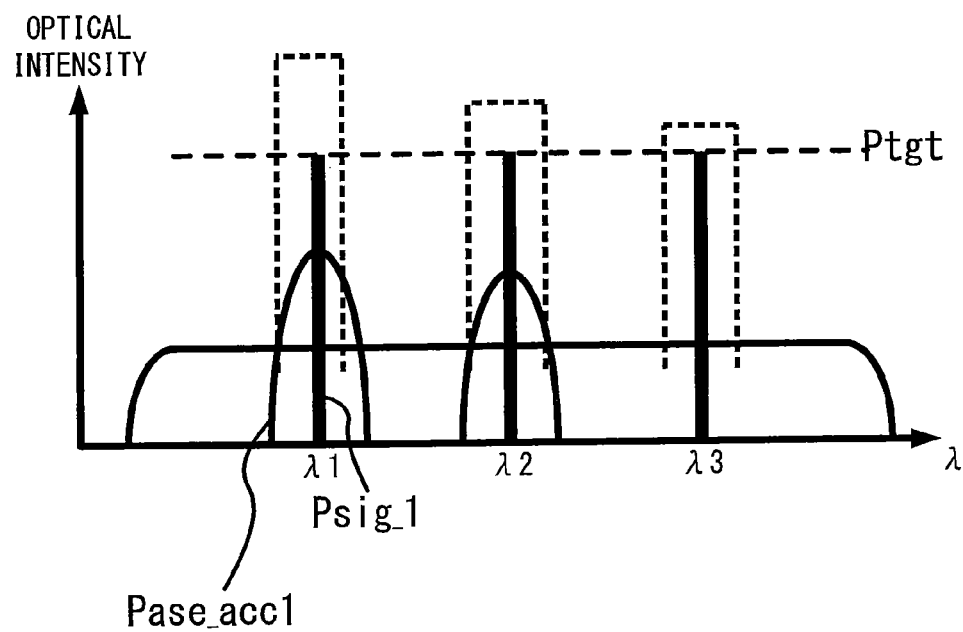

(5) After that, the correction among channels illustrated in FIG. 2D is performed. The set values in the VOA 101A to 101C on the channels are corrected.

$$Vm' = Vm \times Pcmp\_m \times \Delta Vpe\_m \quad \text{[Formula 9]}$$

Thus, the real levels (illustrated by the solid lines) of the optical signals on the channels are corrected to the target level Ptgt.

If occurring a change in optimum amount of pre-emphasis after performing the processing, the control is followed by pre-emphasis again. The correction processing above allows optimum level setting in consideration of real levels of optical signals, which may eliminate OSNR deviations among channels and may educe the system performance maximally. Under this condition, the optical signals that the OSNR deterioration on all channels is cancelled may be output.

First Embodiment

Figure 3:
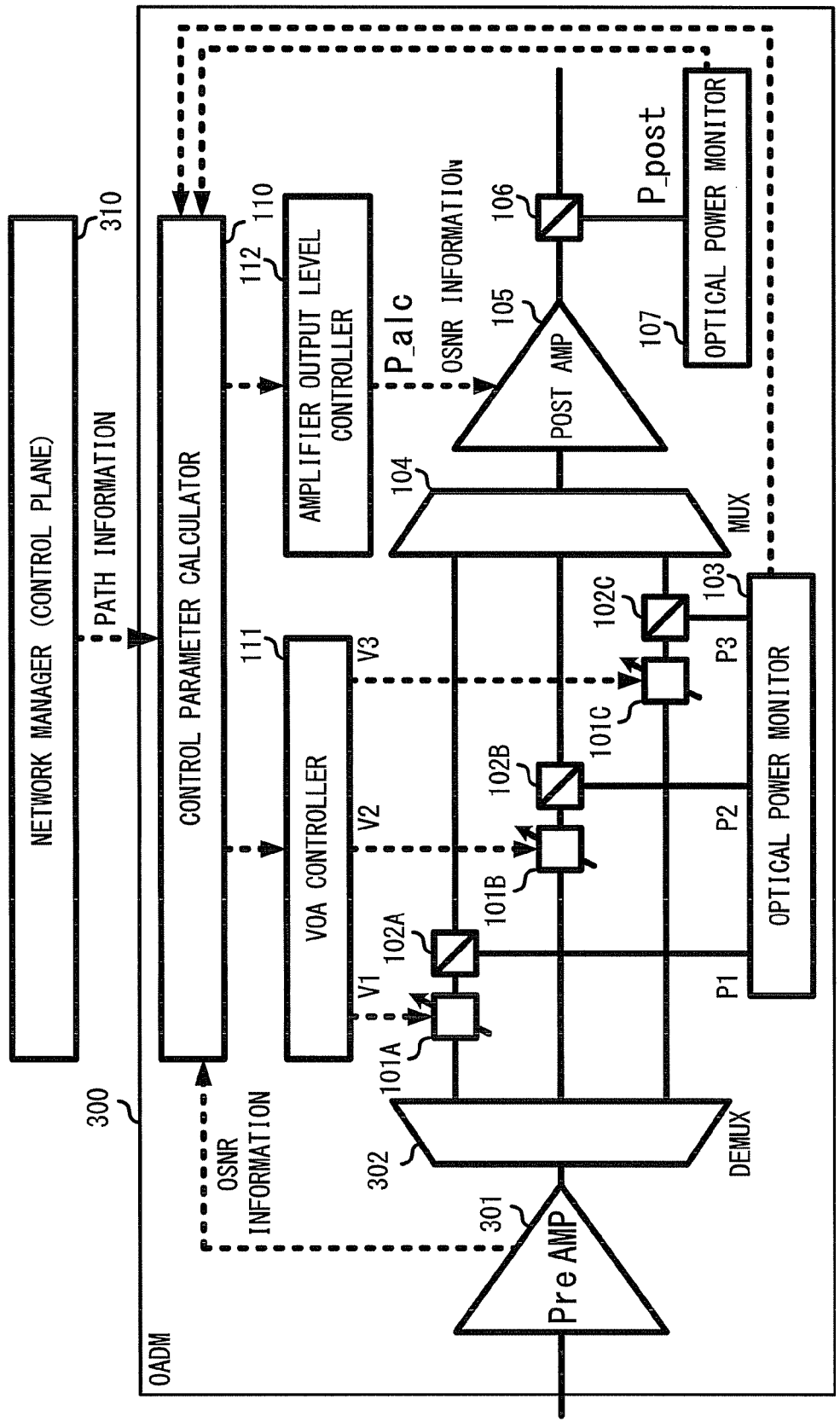
FIG. 3 is a diagram illustrating a functional configuration of a WDM transmission apparatus according to First Embodiment.

FIG. 3 is a block diagram illustrating a functional configuration of a WDM transmission apparatus according to First Embodiment. The WDM transmission apparatus is an OADM 300 provided in one node on a network. For convenience of description, like reference numerals designate like components to those in FIG. 1, and the description will be omitted. An OADM 300 includes a pre-amplifier 301 and a demultiplexer (Demux) 302. The demultiplexer 302 demultiplexes into wavelengths $\lambda$ on channels. After the demultiplexer 302, for example, the VOAs 101A to 101C and multiplexer (Mux) 104 are arranged, illustrated in FIG. 1. The paths, not illustrated, in different wavelengths between the demultiplexer 302 and the multiplexer 104 have an optical switch for adding/dropping an optical signal in an arbitrary wavelength.

For the pass bands (BWs) of the demultiplexer 302 and multiplexer 104, pre-measured values may be stored and set as a database in a memory, for example, of a control parameter calculator 110. According to First Embodiment, the OSNR information on channels are transferred from an apparatus (such as an OADM apparatus in the previous stage on the path of an optical signal on the corresponding channel) on the upstream side of the OADM 300 over an optical supervisory channel (OSC). The optical supervisory channel is demultiplexed from a main optical signal by the pre-amplifier 301 or a coupler, not illustrated, and is input to the control parameter calculator 110. Since the OSNR of each span depends on the NF characteristic and input level of the pre-amplifier 301 in the corresponding span, the NF information is prestored in the pre-amplifier 301. During a system operation, the OSNR of each span is calculated on the basis of the input level and is transferred over the optical supervisory channel (OSC) to the OADM 300 on the downstream side.

The control parameter calculator 110 connects to an external network manager (control plane) 310. The control parameter calculator 110 receives information (path information) on the spans through which the channels pass from the network manager 310. Then, the control parameter calculator 110 uses the OSNR information and the path information on channels to calculate the OSNRs of the channels. For example, spans from the upstream side are defined as Span 1, Span 2, . . . and Span X, and the OSNRs at the spans are defined as OSNR_s1, OSNR_s2, . . . and OSNR_sX for calculation.

More specifically, if the path of a channel 1 includes Span 2 to Span 4, the OSNR of the channel 1 (OSNR 1) is acquired by:

$$OSNR1 = 1/\{(1/OSNR\_s2) + (1/OSNR\_s3) + (1/OSNR\_s4)\} \quad \text{[Formula 10]}$$

(in antilogarithms)

Figure 4:
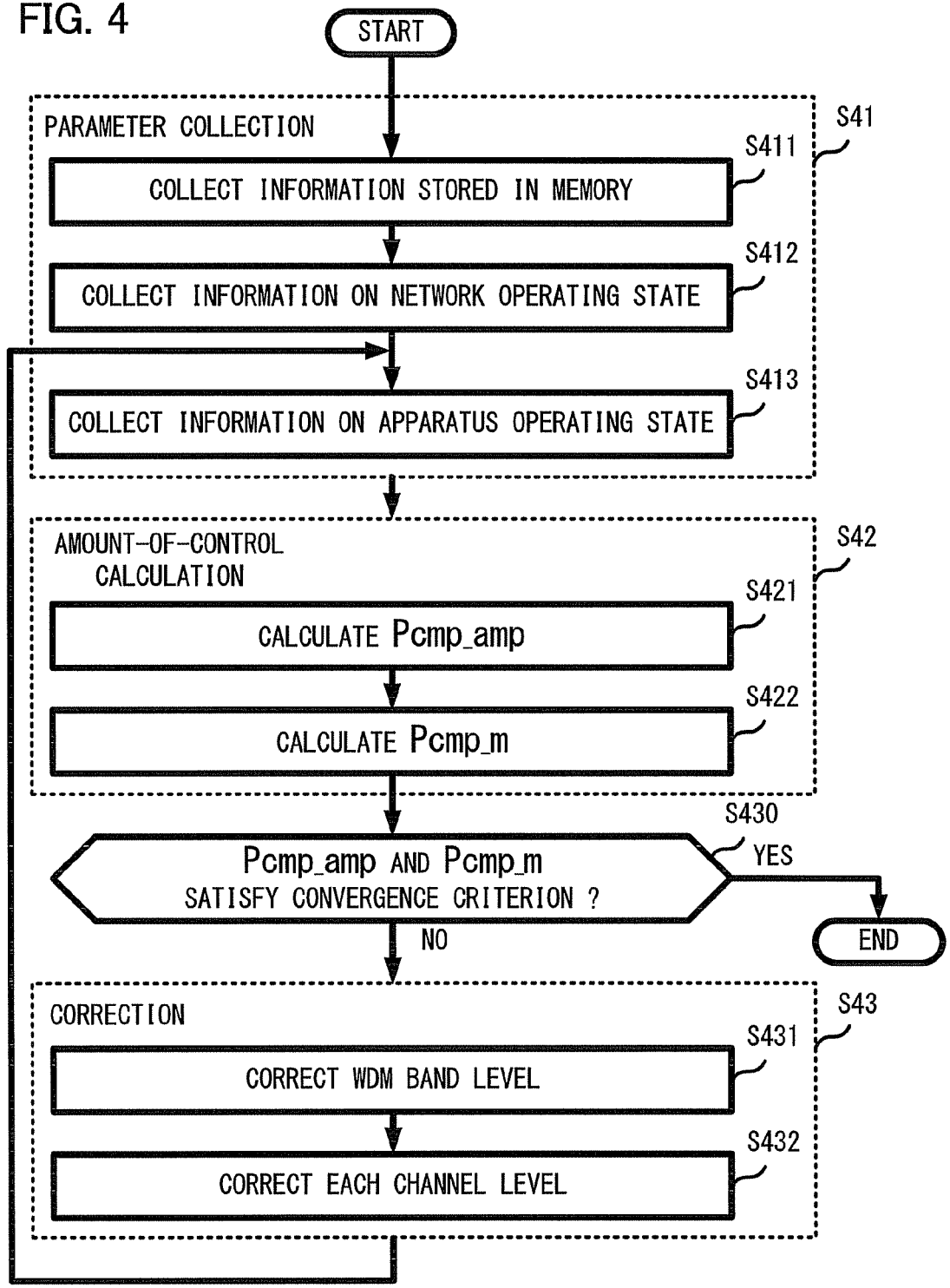
FIG. 4 is a flowchart illustrating a routine of control processing according to First Embodiment.

FIG. 4 is a flowchart illustrating a routine of control processing according to First Embodiment. The control processing may be divided roughly into parameter collection processing (step S41), amount-of-control calculation processing (step S42) and correction performing processing (step S43). First of all, the parameter collection processing (step S41) is performed at an initial state. In the parameter collection processing (step S41), a target level Ptgt of a signal and pass bandwidths BWs of the demultiplexer and multiplexer, which are information stored in a memory, for example, of the control parameter calculator 110 are read out (step S411). As information on a network (NW) operating state, the optical signal-to-noise ratios OSNRm of channels and number of operating channels L are read out (step S412). As information on an apparatus operating state, a total power Pm before multiplexing on channels, the current amount of level control Vm for the channels and a total output power P_post by the post-amplifier 105 are read out (step S413). Here, the amount of pre-emphasis ΔVpe_m [dB] may be read out.

Next, in the amount-of-control calculation processing (step S42), Formula 6 above is used to calculate the amount of WDM band level correction Pcmp_amp (step S421). Formula 7 above is used to calculate the amount of level correction Pcmp_m required for each channel (step S422). After that, whether the amount of WDM band level correction Pcmp_amp and the amount of level correction Pcmp_m required for each channel satisfy a convergence criterion or not is determined (step S430). More specifically, as illustrated in FIG. 2C, whether the signal level average value Psig_ave of all channels is equal to the target level Ptgt of signals or not is determined. Furthermore, as illustrated in FIG. 2D, whether the real levels of optical signals on channels are equal to the target level Ptgt or not is determined.

During the period until the convergence criterion is satisfied in step S430 (meaning step S430: No), the correction processing in step S43 is performed. The correction processing step S43 includes correction on a WDM band level (step S431) and correction on each channel level (step S432). In the processing, the VOA controller 111 controls the attenuation amount in the VOA 101A to 101C such that the signal level average value Psig_ave of all channels may be equal to the target level Ptgt. The amplifier output level controller 112 controls the output level of the post-amplifier 105 such that the real levels of optical signals on channels may be equal to the target level Ptgt. The control changes the apparatus operating state (monitor value) in step S413. Thus, the processing in steps S42 and S43 is performed again, whereby finally, the correction control processing ends if the convergence criterion in step S430 is satisfied (step S430: Yes).

In the correction control processing, either correction on a WDM band level in step S431 or the correction on channel levels in step S432 may be performed first. In this way, with the configuration according to First Embodiment, the collection of information on OSNRs and the number of operating channels, which are parameters of network operating states, allows detection of the real levels of optical signals on the channels. Thus, the real levels of the optical signals may be converged to a target level Ptgt. Since it allows optimum level setting in consideration of real levels of optical signals, the OADM 300 may output an optical signal at a state without OSNR deviations among channels. As a result, the transmission distance of optical signals over the entire optical network may be increased.

Second Embodiment

Figure 5:
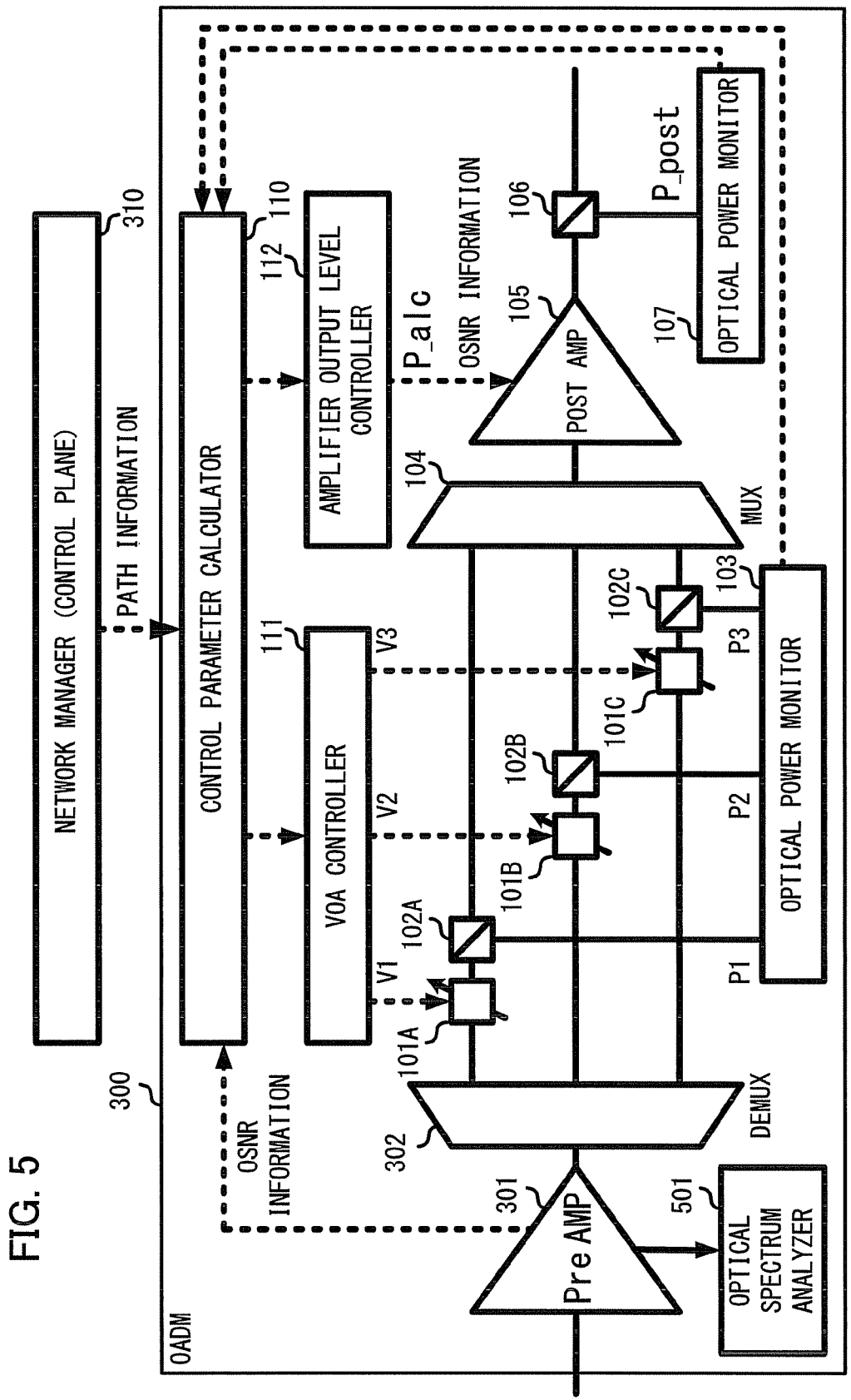
FIG. 5 is a diagram illustrating a functional configuration of a WDM transmission apparatus according to Second Embodiment.

FIG. 5 is a block diagram illustrating a functional configuration of a WDM transmission apparatus according to Second Embodiment. Like reference numerals designate like components to those of First Embodiment. The configuration of Second Embodiment is different from that of First Embodiment in that an optical spectrum analyzer 501 is further provided. The optical spectrum analyzer 501 is connected to the apparatus through the output of the pre-amplifier 301 or a coupler, not illustrated, and measures the optical spectrum in a wavelength of a channel, which is input to the OADM 300. Thus, the information on an OSNR may be measured within the OADM 300 without externally acquiring it.

In this way, the optical spectrum analyzer 501 is arranged at the output part of the pre-amplifier 301 in each of the OADMs 300 over a network and measures the OSNR of the corresponding OADM-OADM. Notably, since no signals are dropped in the In-Line node, the OSNR of each OADM-OADM is only required. This eliminates the necessity for measuring the OSNR of each span. The OSNR of a channel may be calculated by using a combination of the information on the span through which a channel passes, which may be acquired from the network manager (control plane) 310, and the OSNR information transferred on an optical supervisory channel (OSC). The calculation method is the same as that of First Embodiment.

The optical spectrum analyzer 501 may connect to the OADM 300 through which an optical signal on a channel passes when the use of the channel is started and measure the corresponding OSNR. The value of the OSNR of the channel after the measurement may be stored in the control parameter calculator 110.

Third Embodiment

Figure 6:
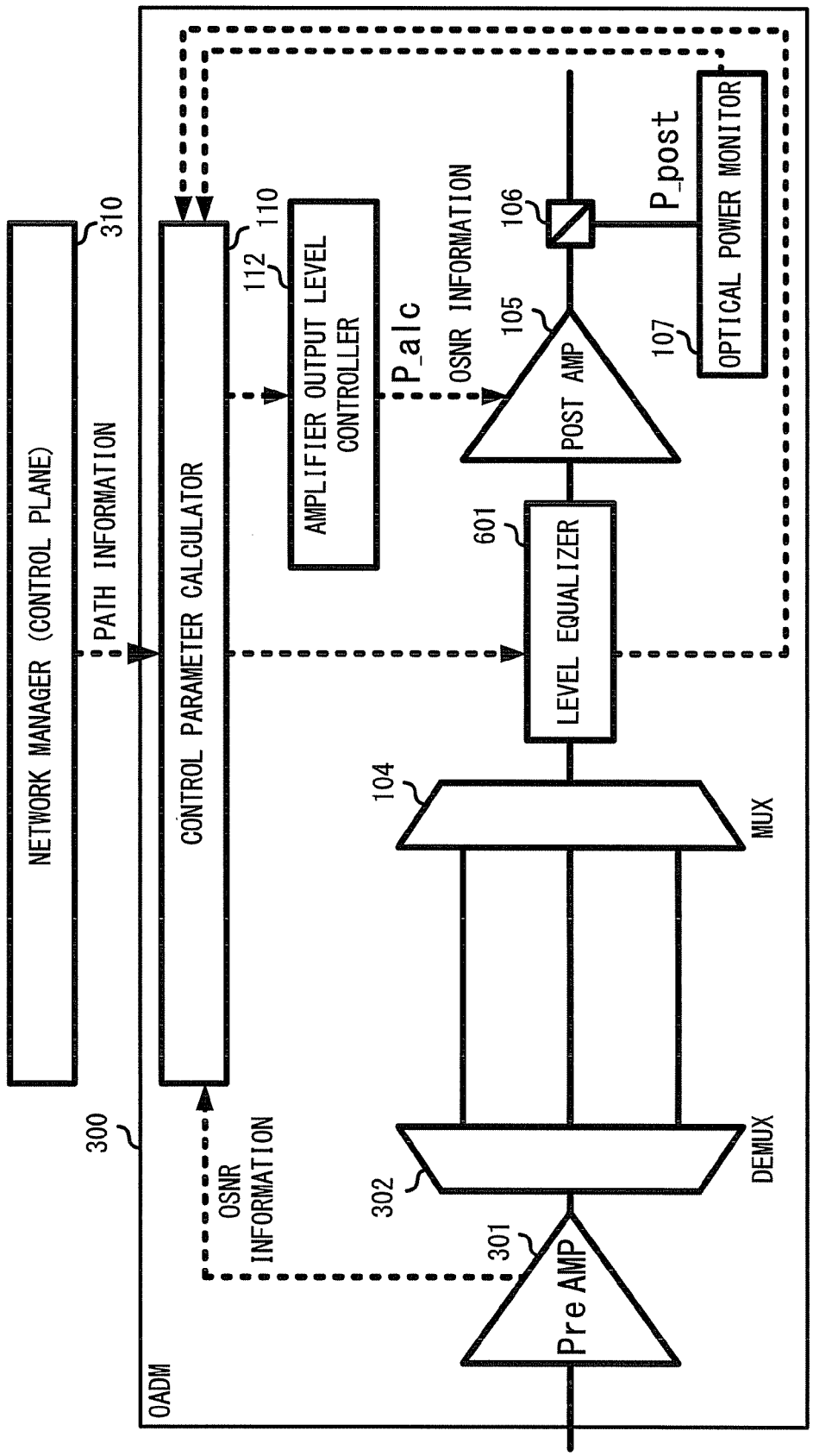
FIG. 6 is a diagram illustrating a functional configuration of a WDM transmission apparatus according to Third Embodiment.

FIG. 6 is a block diagram illustrating a functional configuration of a WDM transmission apparatus according to Third Embodiment. According to Third Embodiment, instead of the VOA 101A to 101C used in First and Second Embodiments, a channel-level adjusting function is provided by a level equalizer 601. The other parts than the part for adjusting the level of an optical signal on each channel are the same as those in First Embodiment. The level equalizer 601 may be a generic device that collectively performs gain control on all bands and equalizes the level deviations of the channels and internally includes the function of an optical spectrum analyzer. The level equalizer 601 monitors an optical spectrum after multiplexing on an optical signal by the multiplexer 104 and controls such that the peak level of the optical signal may be equal to the target level Ptgt. According to Third Embodiment, the couplers 102A to 102C are not necessary.

Fourth Embodiment

According to the embodiments above, the real signal level Psig_m of each channel is calculated by using Formula 4 above. On the other hand, according to Fourth Embodiment, the real signal level Psig_m is directly acquired by actual measurement. This corresponds to the configuration for calculating the OSNR information.

Figure 7:
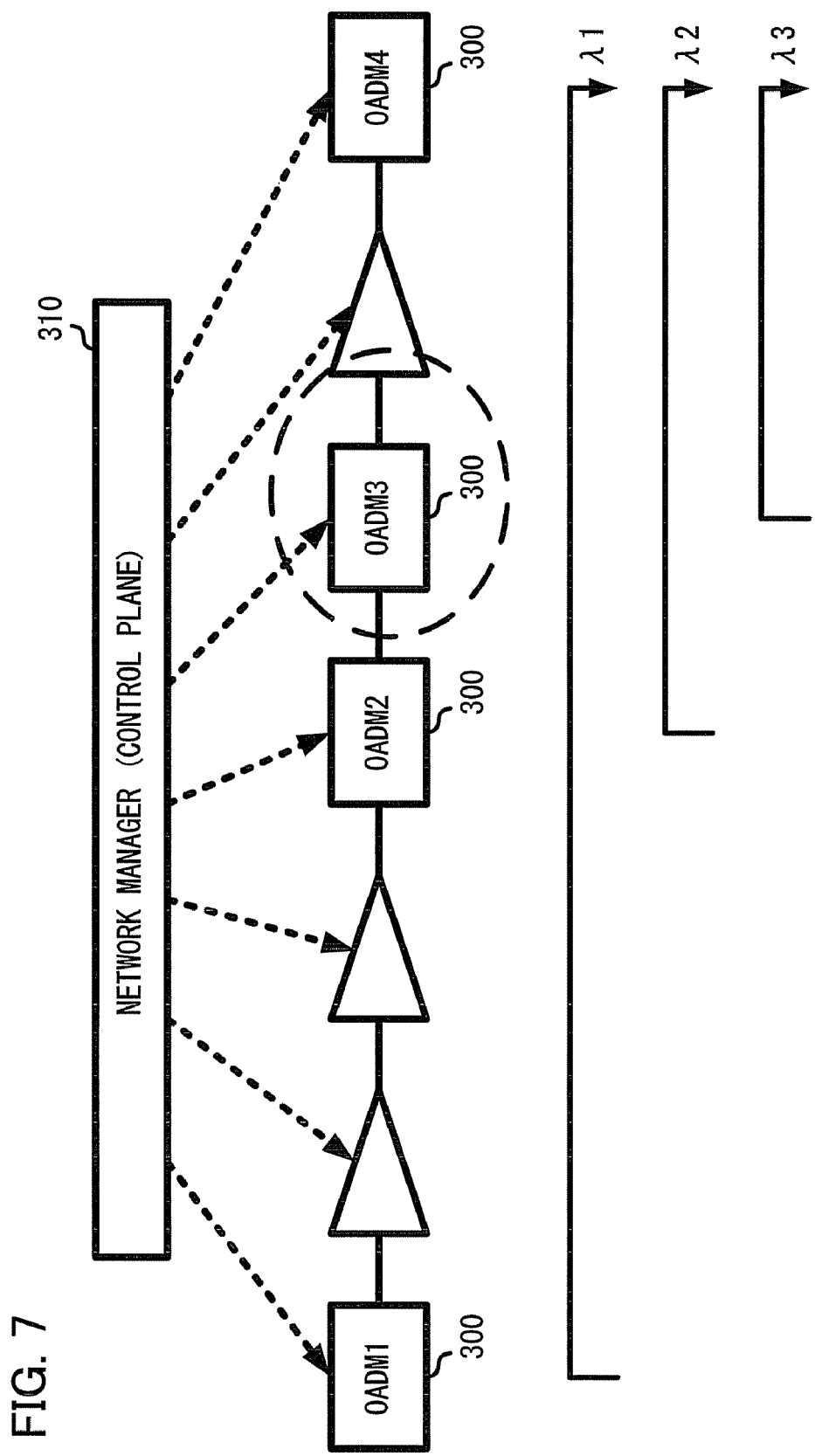
FIG. 7 is a diagram illustrating a schematic configuration of a WDM transmission apparatus according to Fourth Embodiment.

FIG. 7 is a diagram illustrating a schematic configuration of a WDM transmission apparatus according to Fourth Embodiment. The illustrated channel 2 (in a wavelength λ2) and channel 3 (in λ3) are being operated over a network. In order to newly add a channel 1 (in λ1), the channel 1 is performed the following processing. The path of an optical signal on the channel 1 is added in an OADM 1 and is dropped from an OADM 4. Thus, in the OADM 3 arranged immediately before the OADM 4 that is the receiving end, the following processing is performed to transmit the OSNR information to the OADM 4.

Figure 8:
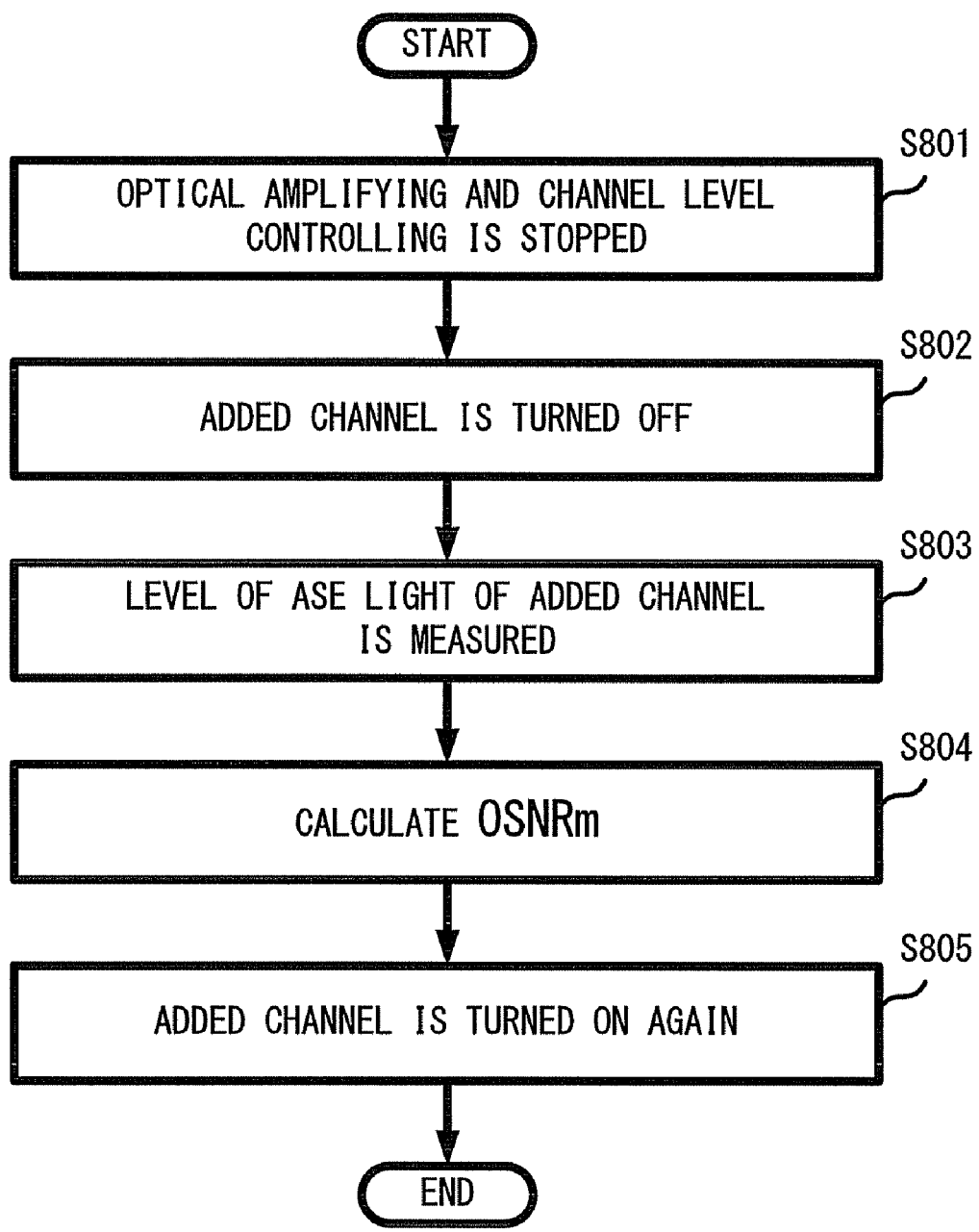
FIG. 8 is a flowchart illustrating a routine of control processing according to Fourth Embodiment.
Figure 9A:
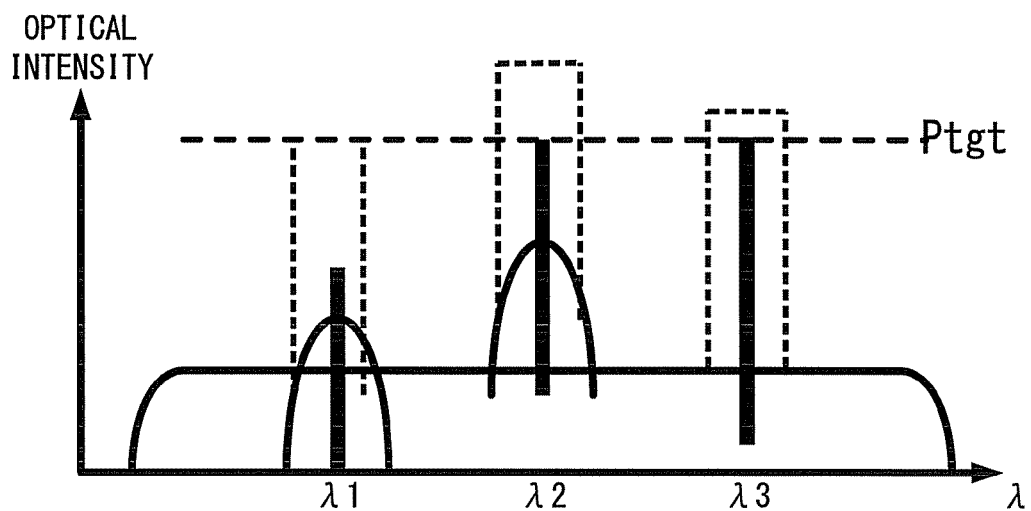
FIGS. 9A and 9B are diagrams illustrating optical signals and ASE levels of channels on a network path.
Figure 9B:
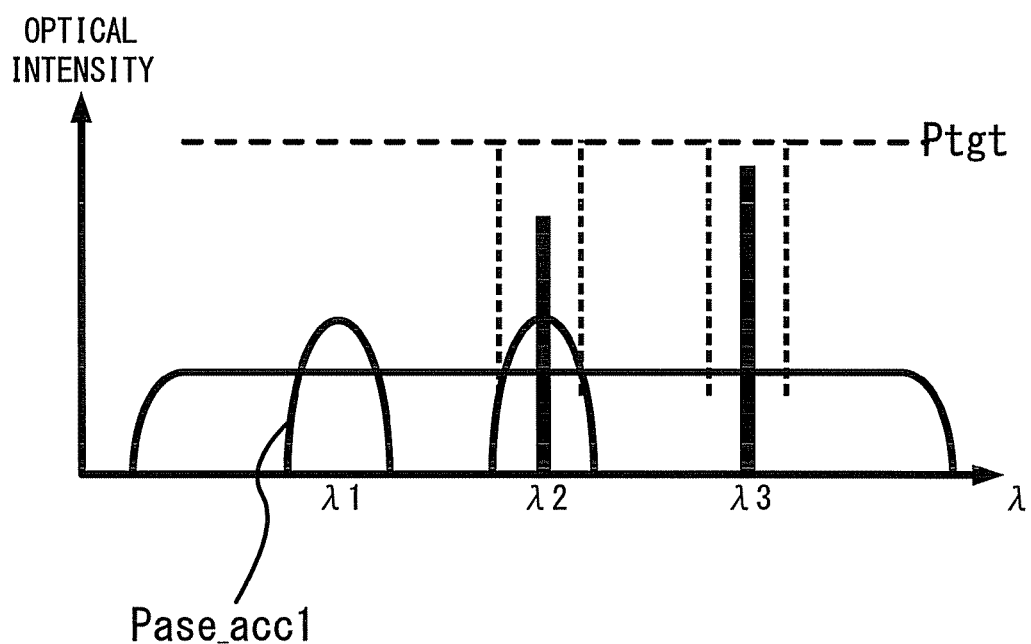
Figure 10A:
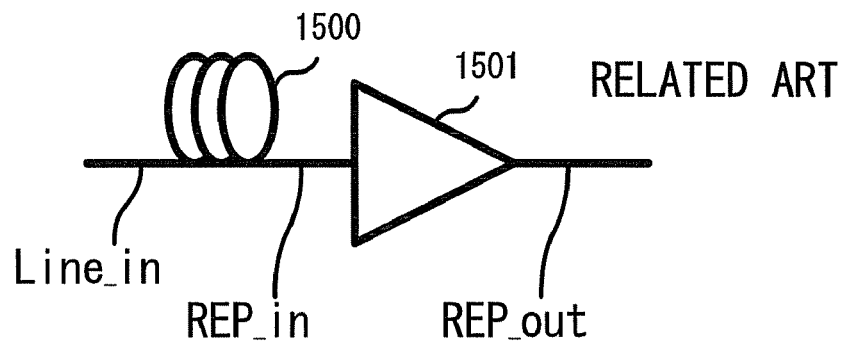
FIG. 10A is a diagram illustrating a configuration of a relay section in a communication system.
Figure 10B:
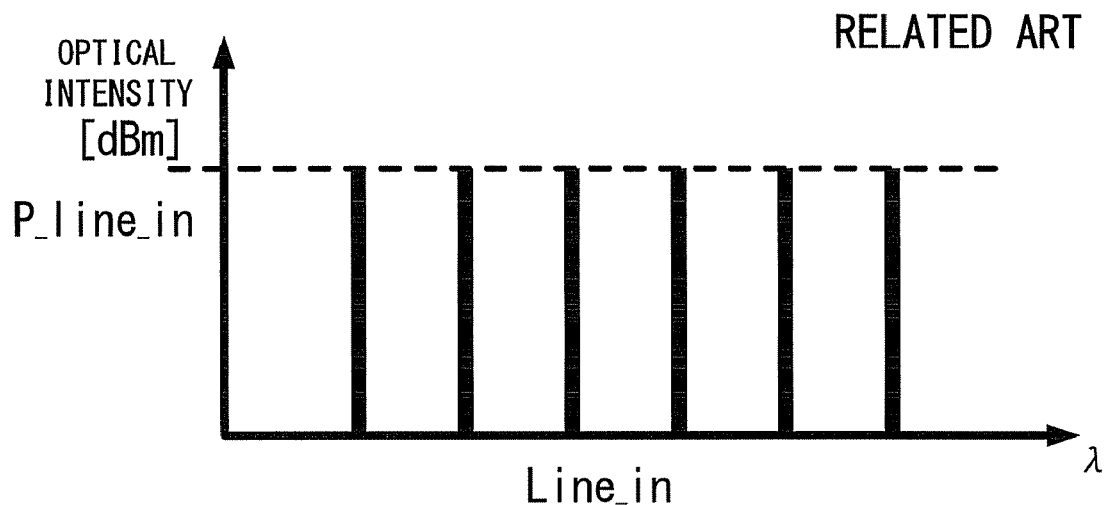
FIGS. 10B to 10D are diagrams illustrating the signal level at spots within the relay section.
Figure 10C:
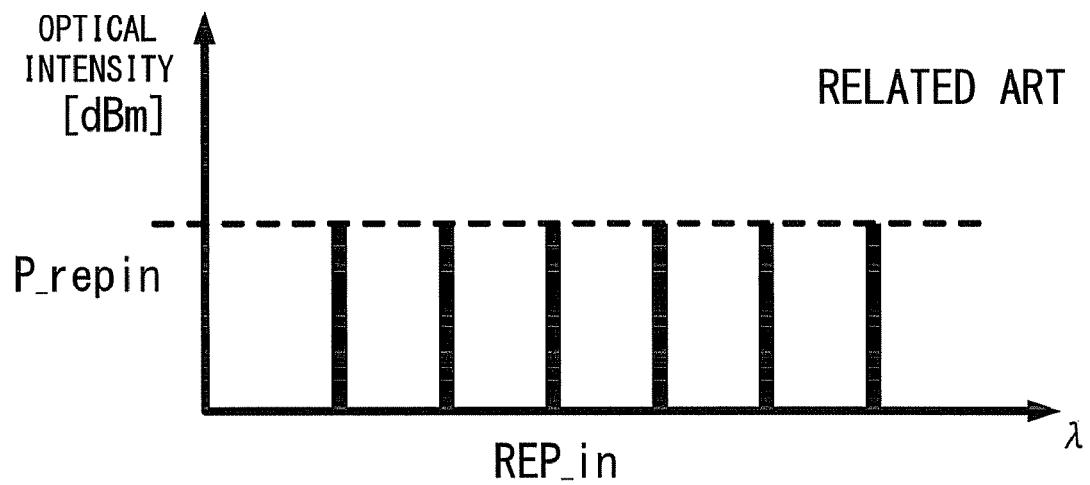
Figure 10D:
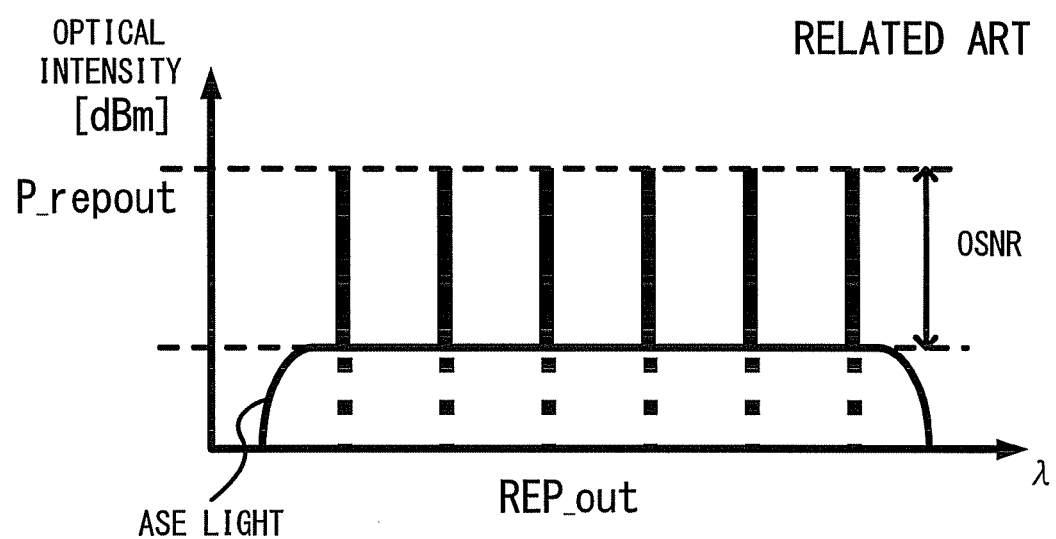
Figure 11A:
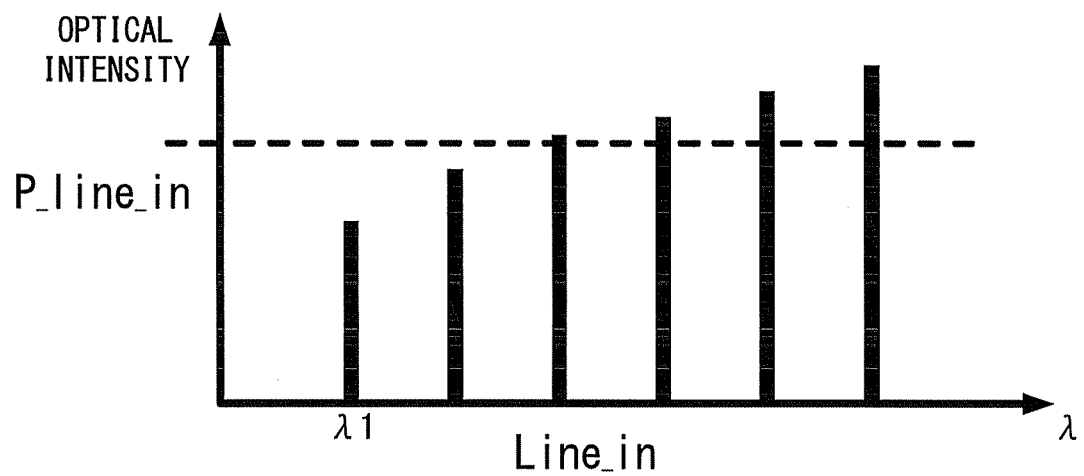
FIGS. 11A to 11C are diagrams illustrating the correction of level deviations among channels.
Figure 11B:
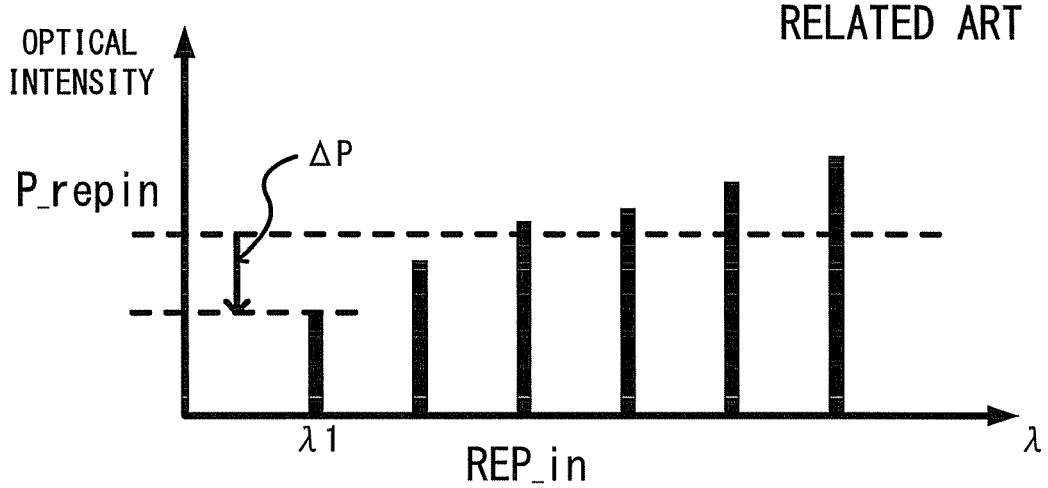
Figure 11C:
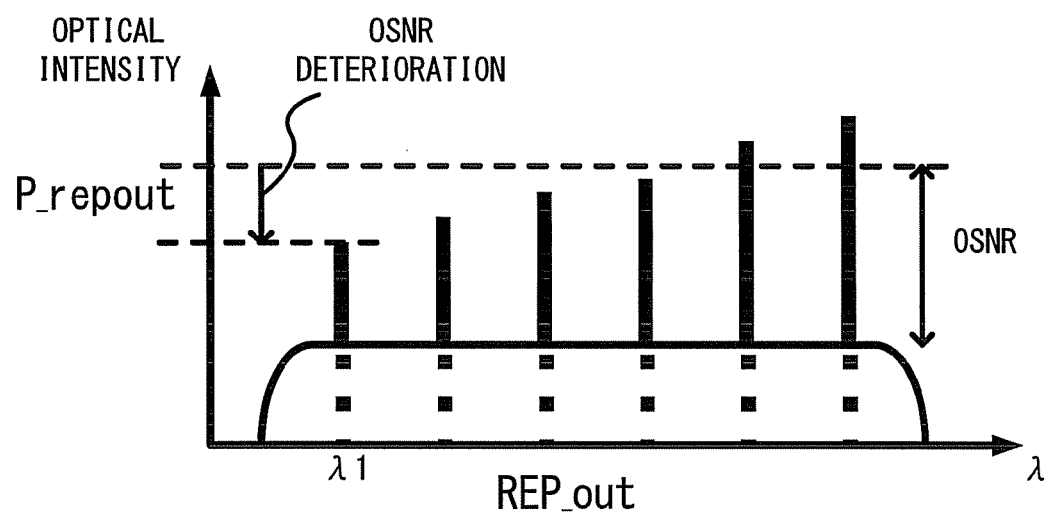

FIG. 8 is a flowchart illustrating a routine of control processing according to Fourth Embodiment. Also in the control processing according to Fourth Embodiment, the similar processing to that in FIG. 4 is performed. The processing illustrated in FIG. 8 corresponds to the collection of OSNR information in information collection of an apparatus operating state (or monitor value thereof) in step S413 in FIG. 4. FIGS. 9A and 9B are diagrams illustrating optical signals and ASE levels of channels on a network path.

First of all, the channel 1 is added by performing processing based on the technology in the past (including level equalization, ASE correction and pre-emphasis). Under the condition, in the OADM 3, the levels of the optical signals illustrated in FIG. 9A are measured. Next, the optical amplifying and channel level controlling that are present on the path of the added channel is stopped (or become freeze condition) (step S801). More specifically, on the channel 1, the optical amplifying corresponds to the optical amplifiers (including the pre-amplifier 301 and post-amplifier 105) in the OADM 1 to OADM 4, and the channel level controlling corresponds to the VOA 101A to 101C. They are locked up to stop the control.

Next, since an optical signal is added on the channel 1 in the OADM 1, the signal on the channel 1 is turned off (step S802). In other words, the level control in the OADM 1 in which the added channel 1 is added is turned off to shift the level of the optical signal to zero. At that time, the level of the optical signal on the channel 1 immediately before turned off (or a total power P1 before multiplexing on the channel 1) is detected by the first optical power monitor 103 and is stored and held in the control parameter calculator 110. In this way, the ASE-level and channel-level adjusting functions of the optical amplifiers at some point of the path for the optical signal on the channel 1 are stopped.

Thus, as illustrated in FIG. 9B, the output spectrum in the post-amplifier 105 in the OADM node 3 at some point of the path of the optical signal on the channel 1 only has ASE light of the channel 1 passing through the filters of the demultiplexer 302 and multiplexer 104, and the level of the ASE light in the wavelength of the added channel is measured (step S803). More specifically, if ASE light is detected by the first optical power monitor 103, the Pase_acc 1 may be measured. Thus, the total power P1 before multiplexing on the channels expressed in Formula 2 above is read out from the control parameter calculator 110, and on the basis of the read total power P1 and the measured value of the level Pase_acc 1 of the ASE light, the real signal level Psig_1 of the channel 1 may be acquired. In this case, Formula 4 is not required to use. By using Formula 3, the OSNRm may be acquired (step S804). After that, the optical signal on the added channel 1 is turned on again (step S805), and the processing ends. At that time, the state immediately before turned off may be recovered. After that, the operation with the optical signal on the channel 1 is started, and the OADM 4 performs the correction control processing on the basis of the real signal level Psig_1 of the channel 1, which is transmitted from the OADM 3.

Without limiting to the processing, in step S803, the optical spectrum analyzer 501 may be provided in the OADM 3. The optical spectrum analyzer 501 may measure Pase_acc1 and the Pase_acc1 at a resolution of 0.1 nm according to the pass bandwidth: BW of the demultiplexer and multiplexer, therefore the OSNR 1 may be easily calculated by using Formula 3.

The correction control processing described above may be configured as a computer-executable program. More specifically, the control parameter calculator 110 illustrated in FIG. 1 and FIG. 3, for example, may include a CPU, a ROM and a RAM. The CPU may execute the program for the steps in the control processing. The program may be stored in a storage medium such as a ROM, and the CPU may read and execute the program.

As described above, the ASE light components having passed through a filter in wavelength multiplexing may be grasped so that the real levels of the optical signals in wavelengths (or on channels) may be calculated. Thus, the OSNRs of wavelengths may be adjusted in an optimum manner to output, whereby the OSNR deteriorations may be prevented.

According to the disclosed WDM transmission apparatus, optical add-drop multiplexer and WDM transmission method, even when the levels of ASE light of a plurality of wavelengths differ, the output level of the optical signal and the level deviation among wavelengths may be properly corrected to prevent the OSNR deterioration. Thus, the OSNR deviation at a receiving end of the optical signal may be eliminated, and the transmission distance of the optical signal may be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A WDM transmission apparatus comprising:
a calculator being operable to calculate optical signal levels of wavelengths, respectively, that have been demultiplexed from a wavelength division multiplexed (WDM) light;
an amplifier controller being operable, after the wavelengths that have been demultiplexed are wavelength division multiplexed together, to control an optical amplifier that amplifies the optical signal levels of the wavelengths after being wavelength division multiplexed together to compensate for the optical signal levels of the wavelengths to become a target level based on the optical signal levels calculated by the calculator; and
a deviation corrector being operable to correct deviations of optical signal levels between the wavelengths based on the optical signal levels calculated by the calculator,
wherein the calculator calculates the optical signal levels based on power levels of the wavelengths after being demultiplexed from the WDM light and before being wavelength division multiplexed together and based on optical-signal-to-noise ratios (OSNRs).

2. The WDM transmission apparatus according to claim 1, wherein the information of OSNRs is transmitted to the calculator in the WDM transmission apparatus from an external apparatus located upstream.

3. The WDM transmission apparatus according to claim 1, wherein the calculator is operable to calculate the information of OSNRs based on path information indicating spans through which the wavelengths pass, the path information being transmitted from an external apparatus.

4. The WDM transmission apparatus according to claim 1, further comprising an optical spectrum analyzer being operable to measure the information of OSNRs.

5. The WDM transmission apparatus according to claim 1, wherein the calculator is operable to calculate the optical signal level of a predetermined wavelength based on a level of amplified spontaneous emission (ASE)) light after the wavelengths are demultiplexed in case that an on/off control for an optical signal of the predetermined wavelength is executed before a starting state of optical transmission operation using the optical signal of the predetermined wavelength.

6. The WDM transmission apparatus according to claim 1, wherein the deviation corrector is operable as a variable optical attenuator that is changeable as to the optical signal level of each wavelength.

7. The WDM transmission apparatus according to claim 1, wherein the deviation corrector is operable as a level equalizer that equalizes optical signal levels of the wavelengths after the wavelengths are wavelength division multiplexed together.

8. An optical add-drop multiplexer comprising:
a demultiplexer being operable to demultiplex wavelengths of an input optical signal;
a multiplexer being operable to multiplex wavelengths of an optical signal, located after the demultiplexer;
an optical switch being operable to add or drop an optical signal having a predetermined wavelength, located between the demultiplexer and the multiplexer;
a deviation corrector being operable to correct a deviation of an optical signal level between each wavelength, located between the demultiplexer and the multiplexer;
an optical amplifier being operable to amplify optical signal levels of all wavelengths of optical signals after wavelength multiplexing, located after the multiplexer;
a calculator being operable to calculate an optical signal level of a wavelength after wavelength demultiplexing by filters included in the demultiplexer and the multiplexer based on information of OSNR; and
an amplifier controller being operable to compensate for the optical signal level of the wavelength after wavelength demultiplexing to become a target level based on an optical signal level calculated by the calculator;
wherein the deviation corrector is operable to correct the deviation based on the optical signal level calculated by the calculator.

9. A WDM transmission method comprising:
calculating optical signal levels of wavelengths, respectively, that have been demultiplexed from a wavelength division multiplexed (WDM) light;
using optical amplification to compensate, after the wavelengths that have been demultiplexed are wavelength division multiplexed together, for the optical signal levels of the wavelengths to become a target level based on the optical signal levels calculated by the calculator; and
correcting deviations of optical signal levels between the wavelengths based on the optical signal levels calculated by the calculator,
wherein said calculating calculates the optical signal levels based on power levels of the wavelengths after being demultiplexed from the WDM light and before being wavelength division multiplexed together and based on optical-signal-to-noise ratios (OSNRs).

10. The WDM transmission method according to claim 9, wherein the calculating is operable to calculate the optical signal level of a predetermined wavelength base on a level of amplified spontaneous emission (ASE) light after the wavelengths are demultiplexed in case that an on/off control for an optical signal of the predetermined wavelength is executed before a starting state of optical transmission operation using the optical signal of the predetermined wavelength.

11. An apparatus comprising:
a demultiplexer to receive a first wavelength division multiplexed (WDM) light and to demultiplex the received first WDM light into wavelengths included in the WDM light;
a multiplexer to wavelength division multiplex the wavelengths that have been demultiplexed from the first WDM light into a second WDM light;
an optical amplifier to amplify the second WDM light;
a calculator to calculate optical signal levels of the wavelengths after being demultiplexed by the demultiplexer and before being wavelength division multiplexed by the multiplexer, based on power levels of the wavelengths after being demultiplexed by the demultiplexer and before being wavelength division multiplexed by the multiplexer and based on upstream optical-signal-to-noise ratios (OSNRs) of the wavelengths;
an optical amplifier to amplify the second WDM light so that optical signal levels of the wavelengths in the second WDM light become a target level based on the optical signal levels calculated by the calculator; and
a deviation corrector to correct deviations of optical signal levels between the wavelengths based on the optical signal levels calculated by the calculator.

12. The apparatus according to claim 11, wherein the deviation corrector includes variable optical attenuators positioned between the demultiplexer and the multiplexer to change the optical signal levels of the wavelengths after being demultiplexed by the demultiplexer and before being wavelength division multiplexed by the multiplexer.

13. The apparatus according to claim 11, wherein the deviation corrector includes a level equalizer positioned after the optical amplifier to equalize the optical signal levels of the wavelengths in the second WDM light.

14. An apparatus comprising:
a demultiplexer to receive a first wavelength division multiplexed (WDM) light and to demultiplex the received first WDM light into wavelengths included in the WDM light;
a multiplexer to wavelength division multiplex the wavelengths that have been demultiplexed from the first WDM light into a second WDM light;
an optical amplifier to amplify the second WDM light;
means for calculating optical signal levels of the wavelengths after being demultiplexed by the demultiplexer and before being wavelength division multiplexed by the multiplexer, based on power levels of the wavelengths after being demultiplexed by the demultiplexer and before being wavelength division multiplexed by the multiplexer and based on upstream optical-signal-to-noise ratios (OSNRs) of the wavelengths;
an optical amplifier to amplify the second WDM light so that optical signal levels of the wavelengths in the second WDM light become a target level based on the optical signal levels calculated by the means for calculating; and
means for correcting deviations of optical signal levels between the wavelengths based on the optical signal levels calculated by the means for calculating.

* * * * *

UNITED STATES PATENT AND TRADEMARK OFFICE
CERTIFICATE OF CORRECTION

| | | |
|---|---|---|
| PATENT NO. | : 8,306,427 B2 | Page 1 of 1 |
| APPLICATION NO. | : 12/640387 | |
| DATED | : November 6, 2012 | |
| INVENTOR(S) | : Ryosuke Goto et al. | |

It is certified that error appears in the above-identified patent and that said Letters Patent is hereby corrected as shown below:

Column 13, Line 7, In Claim 5, delete "(ASE))" and insert -- (ASE) --, therefor.

Signed and Sealed this
Twenty-ninth Day of January, 2013

David J. Kappos
*Director of the United States Patent and Trademark Office*